United States Patent
Nishigaya et al.

(10) Patent No.: US 6,308,182 B1
(45) Date of Patent: *Oct. 23, 2001

(54) INFORMATION PROCESSING APPARATUS

(75) Inventors: Takashi Nishigaya; Ichiro Iida, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/009,461

(22) Filed: Jan. 16, 1998

(30) Foreign Application Priority Data

May 20, 1997 (JP) .................................... 9-130160

(51) Int. Cl.[7] .................................................. G06F 17/00
(52) U.S. Cl. .............................. 707/103; 711/145; 717/5
(58) Field of Search .............................. 707/205, 1, 103, 707/200, 203; 711/145; 717/5–9, 10–12

(56) References Cited

U.S. PATENT DOCUMENTS

| 5,008,853 | * | 4/1991 | Bly et al. .......................... 345/331 |
| 5,018,060 | * | 5/1991 | Gelb et al. ........................ 707/205 |
| 5,072,412 | * | 12/1991 | Henderson, Jr. et al. ........... 345/346 |
| 5,253,361 | * | 10/1993 | Thurman et al. .................... 707/3 |
| 5,355,445 | * | 10/1994 | Shibao et al. ..................... 706/50 |
| 5,379,432 | * | 1/1995 | Orton et al. ....................... 709/303 |
| 5,577,230 | * | 11/1996 | Argade et al. ...................... 711/150 |
| 5,655,088 | * | 8/1997 | Midorikawa et al. ................ 705/37 |
| 5,794,229 | * | 8/1998 | French et al. ........................ 707/2 |
| 5,835,949 | * | 11/1998 | Quattromani et al. .............. 711/135 |

FOREIGN PATENT DOCUMENTS

| 0 264 568 | 4/1988 | (EP) . |
| 4-170642 | 6/1992 | (JP) . |
| WO 94/01819 | 1/1994 | (WO) . |

OTHER PUBLICATIONS

S. S. Yau et al., "An Object–Oriented Approach to Software Development for Parallel Processing Systems", Proceedings of the International Computer Software and Applications Conference (COMPSAC), Tokyo, Sep. 11–13, 1991, No. CONF. 15, Sep. 11, 1991, pp. 453–458, XP000260562.
Search Report for Appln. No. EP 98 30 0383.

* cited by examiner

*Primary Examiner*—Hosain T. Alam
*Assistant Examiner*—Jean Bolte Fleurantin
(74) *Attorney, Agent, or Firm*—Staas & Halsey, LLP

(57) ABSTRACT

A part of a program code of a program being processed can be deleted or replaced without stopping the program. A class data monitor unit monitors the utilization of class data stored in a class data storage unit for each piece of added class data. A class data process unit deletes or replaces a part of a program during the execution of the program by deleting or replacing the class data based on the utilization of the class data monitored by the class data monitor unit.

38 Claims, 31 Drawing Sheets

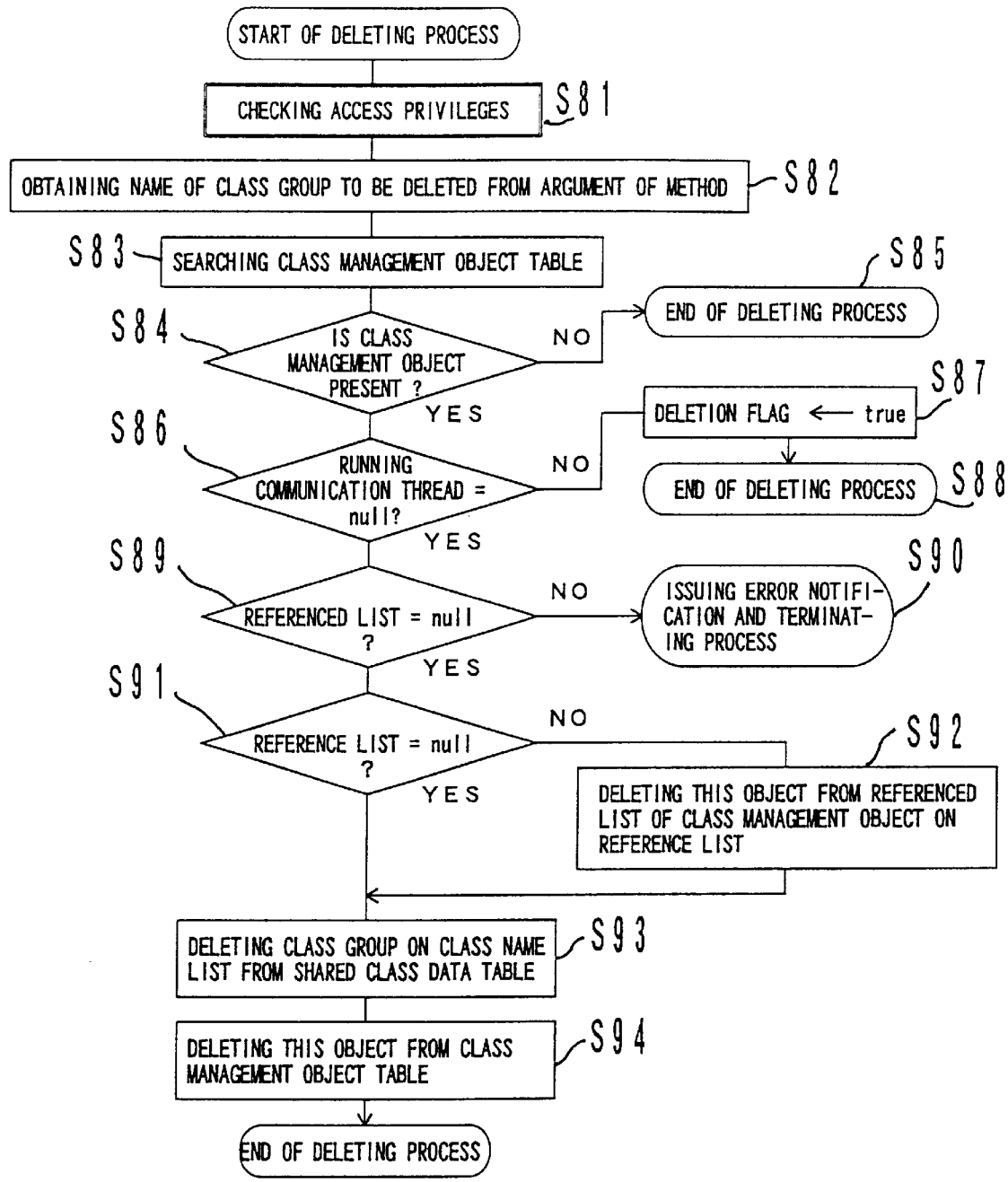
F I G. 2 1

INFORMATION PROCESSING APPARATUS

BACKGROUND OF THE INVENTION

1. Field of the Invention

The present invention relates to an information processing apparatus and is specifically applicable when performing distributed object-oriented programming, etc.

2. Description of the Prior Art

Conventionally, a distributed system can be easily developed because a method can be issued to an object in a remote computer as in the case of issuing a method to an object in a local computer using distributed object-oriented technology such as CORBA (common object request broker architecture), DCOM (distributed component object model), JavaRMI (Java remote method invocation), etc.

However, since the conventional distributed object-oriented technology has no functions of replacing a part of a program code of a server object being operated or adding a part of a program code with new functionality from a remote computer, distributed objects cannot be smoothly managed.

For example, when a program for a new inquiry command is to be executed in a database server object, the server object should be terminated and reset in such a way that a newly added program can be available to the server object, and then it should be activated again.

Therefore, with an increasing number of server objects associated with an updated service, a longer time is taken to stop the service because it normally takes a long time to add or update a program code of a server object in a distributed system.

Additionally, there has been the performance problem in case that the distributed system has a severe influence of a network delay when a plurality of methods are invoked for the same object, or when a large amount of data is passed through a method's parameters or a return value.

Furthermore, the number of method interfaces of a server object should be increased for diversification to utilize the server object for general purposes or to customize a client side program using the server object interfaces.

Therefore, in the conventional distributed system, the complicated server interfaces increase the difficulty of application development and the service response delay.

Furthermore, the conventional distributed system has the problem that an administrator has heavy responsibility in maintaining and managing the security of the interface when a program code is added or updated.

SUMMARY OF THE INVENTION

Thus, the first object of the present invention is to delete or replace a part of a program code without stopping the program being operated.

The second object of the present invention is to easily customize a program without programmer's knowledge of class management.

The third object of the present invention is to improve the security of the interface when a program code is added or updated in a distributed system.

To solve the above described problems, the present invention includes a class data storage unit for storing class data added to an object; a class data monitor unit for monitoring the utilization of the class data; and a class data process unit for processing the class data based on the utilization of the class data.

Thus, a program can be formed by class data, and the utilization of the program can be monitored for each piece of added class data. As a result, the class data being used can be recognized while the program is operated, and a part of the program code can be deleted or replaced during the execution of the program.

According to an aspect of the present invention, when class data specified by an operation request is being used, the operation to the class data is delayed until the end of the use of the class data.

Therefore, even if a process request for deletion or replacement of a part of program is issued to a program being executed, a part of the program can be deleted or replaced without stopping the operation of the program, thereby reducing the load of the programmer when customizing the program.

Another aspect of the present invention includes a check unit for checking whether or not a request to process class data is acceptable.

Thus, a request to add or update a program code can be rejected, and the security of the interface in adding and updating the program code can be improved.

According to a further aspect of the present invention, class data is added to a class data storage unit at each class data addition request.

Thus, the class data addition request can be identified, and an operation can be performed on the program for each function including the class data at the addition request. Therefore, the program can be easily customized without programmer's knowledge about class management.

A further aspect of the present invention includes an agent class for generating an agent class object for monitoring the utilization of class data, and generates an agent class object according to the agent class when an operation is performed in the class data.

Thus, the function of monitoring a program can be easily added to the program to be monitored, the utilization of the program can be easily monitored without programmer's knowledge about class management, and a part of the program code can be deleted or replaced while the program is running.

According to a further aspect of the present invention, an agent class generates a class management object for managing class data added to an agent class object each time a request to add class data is issued.

Thus, a program can be monitored for each function newly added to the program, and when the program is running, it can be determined which function of the program is being used. Therefore, only specifying the function of a part of the program can delete or replace the function of the program while the program is running.

A further aspect of the present invention stores the relation between the class management object generated according to a class data addition request and identification information about the class management object.

Thus, only specifying identification information such as a name of a class management object, etc. deletes and replaces a part of a program code while the program is running, thereby reducing the load of the programmer when customizing the program.

According to a further aspect of the present invention, a class management object includes a local class data table for storing class data specific to the class management object.

Thus, even when a conflict between the class data transmitted from another object and the class data being managed by a class management object occurs, the class data transmitted from another object and the class data being managed by a class management object can be independently stored, and an agent class object can remotely process the class data transmitted from another object.

According to a further aspect of the present invention, a class management object includes a deletion flag for storing a class data deletion request.

Thus, a class data deletion request can be stored and accepted while the class data specified by the data deletion request is being used. As a result, it is not necessary to reissue a class data deletion request after the request is once rejected. Because the actual deletion of the class data is managed to be deferred, the load of the programmer can be reduced.

According to a further aspect of the present invention, a class management object includes a replacement class data storage area for storing new class data when class data replacement request is issued.

Thus, new class data can be stored when a replacement request is issued, and a class data replacement request can be accepted while the class data specified by the class data replacement request is being used. As a result, it is not necessary to reissue a class data replacement request after the request is once rejected. Because the actual deletion of the class data is managed to be deferred, the load of the programmer can be reduced.

According to a further aspect of the present invention, a class management object includes a running thread list for storing identification information about a thread which is processing class data.

Thus, only referencing the running thread list determines whether or not class data being processed exists, and the utilization of the class data can be easily checked.

According to a further aspect of the present invention, a class management object includes a class name list for storing a class name of added class data.

Thus, the class management object can easily check the class data managed by itself, and can process class data for each piece of added class data.

According to a further aspect of the present invention, a class management object includes a reference object list for storing identification information about the class management object which manages class data referenced by certain class data, and a referenced object list for storing identification information about a class management object which manages class data referencing certain class data.

Thus, an operation can be performed on class data in consideration of the references of the class data, and the programmer does not have to recognize the references of the class data. Therefore, the program can be easily customized.

According to a further aspect of the present invention, an agent class includes an access control class for checking access privileges from an object of another agent class.

Thus, an agent class object can generate an access control object based on an access control class when another agent class object gains access. Therefore, each time an agent class object gains access, access privileges are checked and an access conditions can be easily amended for each agent class object, thereby improving the security of the interface in adding or updating a program code.

A further aspect of the present invention includes a public remote method interface for adding class data to an agent class object.

Therefore, during the execution of a program, class data can be newly added for the program.

A further aspect of the present invention includes a class management object generation unit for generating a class management object for class data added to an agent class object; a class name registration unit for registering a class name of class data in a class name list in the class management object; a class data table write unit for writing the class data in a shared class data table; and a class management object table registration unit for registering identification information about the class management object in a class management object table.

Thus, the agent class object can monitor the utilization of each added class data, easily specify the added data, and perform an operation on the class data.

According to a further aspect of the present invention, when a class name of class data added to an agent class object matches a class name of class data registered in a shared class data table, the class data added to the agent class object is removed from the shared class data table.

Thus, a conflict in the same class in the shared class data table can be avoided.

A further aspect of the present invention includes a public remote method interface for processing class data stored in an agent class object.

Thus, the agent class object can execute an operation represented by a class data.

According to a further aspect of the present invention, when class data being processed references another class data, execution information is set for a class management object which manages the class data being processed, and is also set for a class management object which manages the referenced class data.

Thus, even if a request to delete or replace the referenced class data is issued while the referencing class data is being processed, the deletion or replacement of the referenced class data can be temporarily held until the end of the process of the referencing class data, thereby avoiding unsuccessfully terminating the process on the class data.

According to a further aspect of the present invention, when a running thread list is empty and a deletion flag of a class management object is set TRUE, class data corresponding to the class name in the class name list of the class management object is removed from the shared class data table.

Thus, after completing the function of a part of a program specified in a deletion request, the function of the part of the program can be deleted. Therefore, suspending the program being executed or reactivating the program can be avoided when the function of the part of the program is requested to be deleted.

According to a further aspect of the present invention, when a running thread list is empty and a replacement class data storage area stores class data, class data to be replaced and stored in the shared class data table is replaced with the class data stored in the replacement class data storage area.

Thus, after completing the function of a part of a program specified in a replacement request, the function of the part of the program can be replaced with another function. Therefore, suspending the program being executed or reactivating the program can be avoided when the function of the part of the program is requested to be replaced.

A further aspect of the present invention includes a public remote method interface for deleting class data from an agent class object.

Thus, the agent class object can delete a part of a program.

According to a further aspect of the present invention, when identification information about a thread is set in a running thread list of a class management object, the deletion of class data processed by the thread is suspended, and a deletion flag of the class management object is set TRUE.

Thus, even when a deletion request is issued for class data being processed, the deletion request for the class data can be accepted without stopping processing the class data. Therefore, the class data can be requested to be deleted without affecting the process on the class data.

A further aspect of the present invention includes a public remote method interface for replacing class data of an agent class object.

Thus, the agent class object can replace a part of a program.

According to a further aspect of the present invention, when identification information about a thread is set in a running thread list of a class management object, the replacement of class data processed by the thread is suspended, and new class data is set in a replacement class data storage area of the class management object.

Thus, even when a replacement request is issued for class data being processed, the replacement request for the class data can be accepted without stopping processing the class data. Therefore, the class data can be requested to be replaced without affecting the process on the class data.

According to a further aspect of the present invention, when a deletion or replacement request is issued, an error notification is transmitted when a referenced object list of a class management object is not empty, and identification information about a referencing class management object is deleted from a referenced object list of a referenced class management object when a reference object list of the class management object is not empty.

Thus, class data referenced by another class data can be prevented from being lost, and unnecessary information can be deleted, thereby improving the convenience when a program is customized.

According to a further aspect of the present invention, an agent class object can remotely execute a program using a public remote method interface for processing class data transmitted from another agent class object.

A further aspect of the present invention stores class data transmitted from another agent class object in a local class data table of a class management object.

Thus, a remote execution can be smoothly performed by an agent class object such that a conflict can be avoided between the class data and class data already stored for the class management object.

According to a further aspect of the present invention, based on class data and serialized data of an object generated from the class data, the object generated from the class data is restored.

Thus, the object generated from the class data is transmitted to another agent class object, and the object can be remotely processed.

According to a further aspect of the present invention, class data to be processed and class data referenced by the class data to be processed are transmitted to another agent class object.

Thus, class data having reference relationship can be remotely processed.

According to a further aspect of the present invention, class data in a destination agent class object is removed, and class data to be processed is transmitted to the destination agent class object.

Thus, the amount of communications in a remote execution can be reduced, and the remote execution speed can be enhanced.

According to a further aspect of the present invention, the execution state of a program including a plurality of functions is monitored for each function, and a process is performed on a function of the program based on the execution state of the program.

Thus, when the function of a part of a program is not executed during the execution of the program, or when the function of a part of the program is completed during the execution of the program, the function of the part can be deleted or replaced during the execution of the program, thereby quickly customizing the program.

BRIEF DESCRIPTION OF THE DRAWINGS

The present invention will be more apparent from the following detailed description, when taken in conjunction with the accompanying drawings, in which;

FIG. 21 is a flowchart showing a class data deleting process;

DESCRIPTION OF THE PREFERRED EMBODIMENTS

The embodiments of the present invention are described below by referring to the attached drawings.

Figure 1:
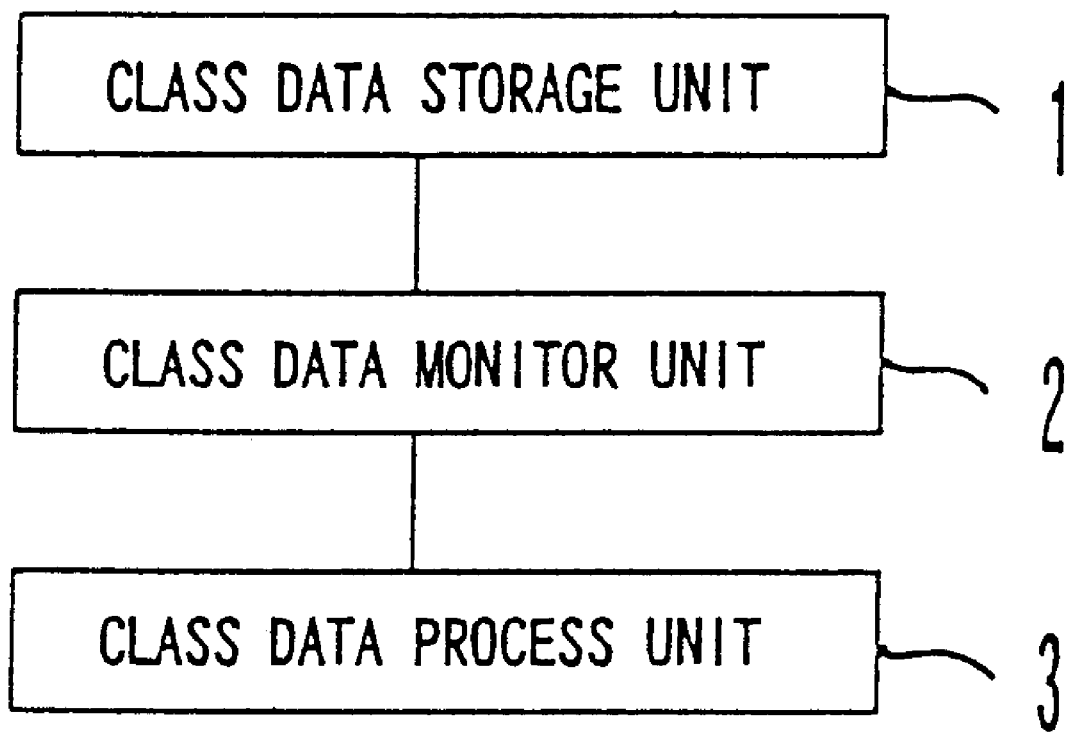
FIG. 1 is a block diagram showing the functional configuration of the information processing apparatus according to an embodiment of the present invention.

FIG. 1 is a block diagram showing the functional configuration of the information processing apparatus according to an embodiment of the present invention.

In FIG. 1, a class data storage unit 1 stores class data added to an object. A class data monitor unit 2 monitors the utilization of the class data stored in the class data storage unit 1 for each piece of added class data. A class data process unit 3 processes the class data for each piece of added class data based on the utilization of the class data monitored by the class data monitor unit 2.

With the above described configuration, the class data monitor unit 2 can monitor a program for each function newly added to the program. While the program is running, it can be determined which function of the program is being used. As a result, the class data process unit 3 can process the function of a part of the program during the operation of the program only by specifying the function of the part of the program.

Figure 2:
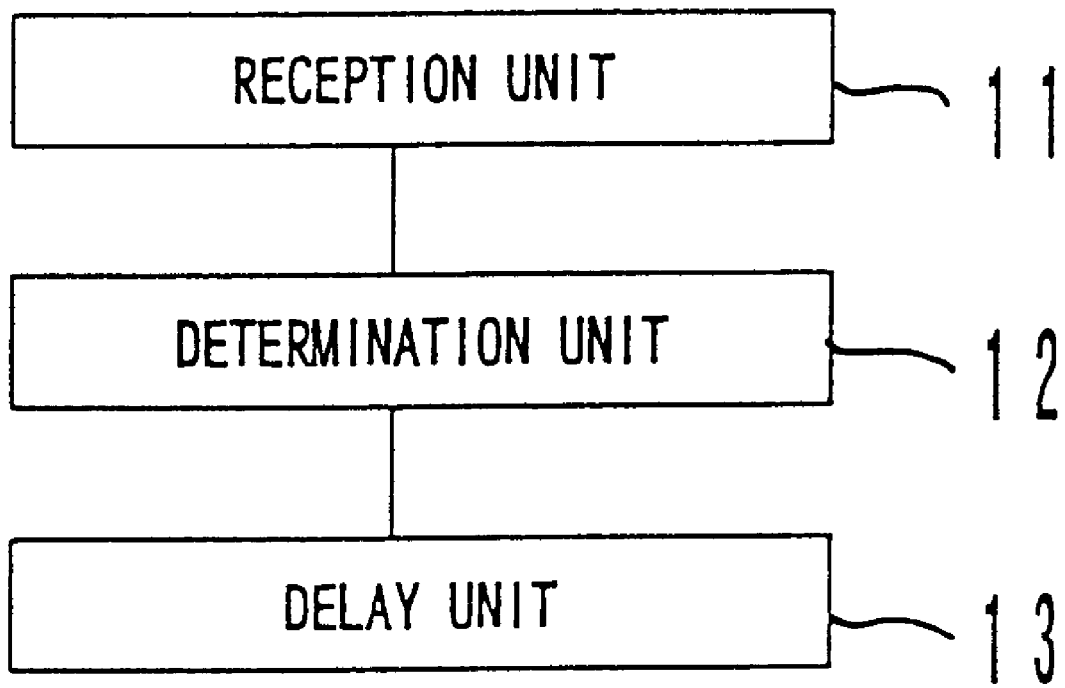
FIG. 2 is a block diagram showing an example of the configuration of the class data process unit shown in FIG. 1.

FIG. 2 is a block diagram showing an example of the configuration of the class data process unit 3 shown in FIG. 1.

In FIG. 2, a reception unit 11 receives a deletion request, a replacement request, etc. for the class data stored in the class data storage unit 1. A determination unit 12 determines whether or not the class data specified by the deletion request, the replacement request, etc. is being used based on the monitor result from the class data monitor unit 2. A delay unit 13 delays the deletion, replacement, etc. of the class data until the use of the class data has been completed if the class data is being used.

When a deletion request or a replacement request for class data being processed is issued, the reception unit 11 receives the deletion request or the replacement request for the class data without stopping processing the class data. The delay unit 13 identifies whether or not the use of the class data to be deleted or replaced has been completed by referring to the determination result from the determination unit 12, and performs a process specified by a deletion request, a replacement request, etc. received by the reception unit 11 after the use of the class data to be deleted or replaced is completed.

After the execution of the function of a part of a program specified by a deletion request or a replacement request is completed, the function of the part of the program can be deleted, replaced with another function, etc. When the function of the part of the program is deleted, replaced, etc., it is not required to suspend or reactivate the program being executed.

Figure 3:
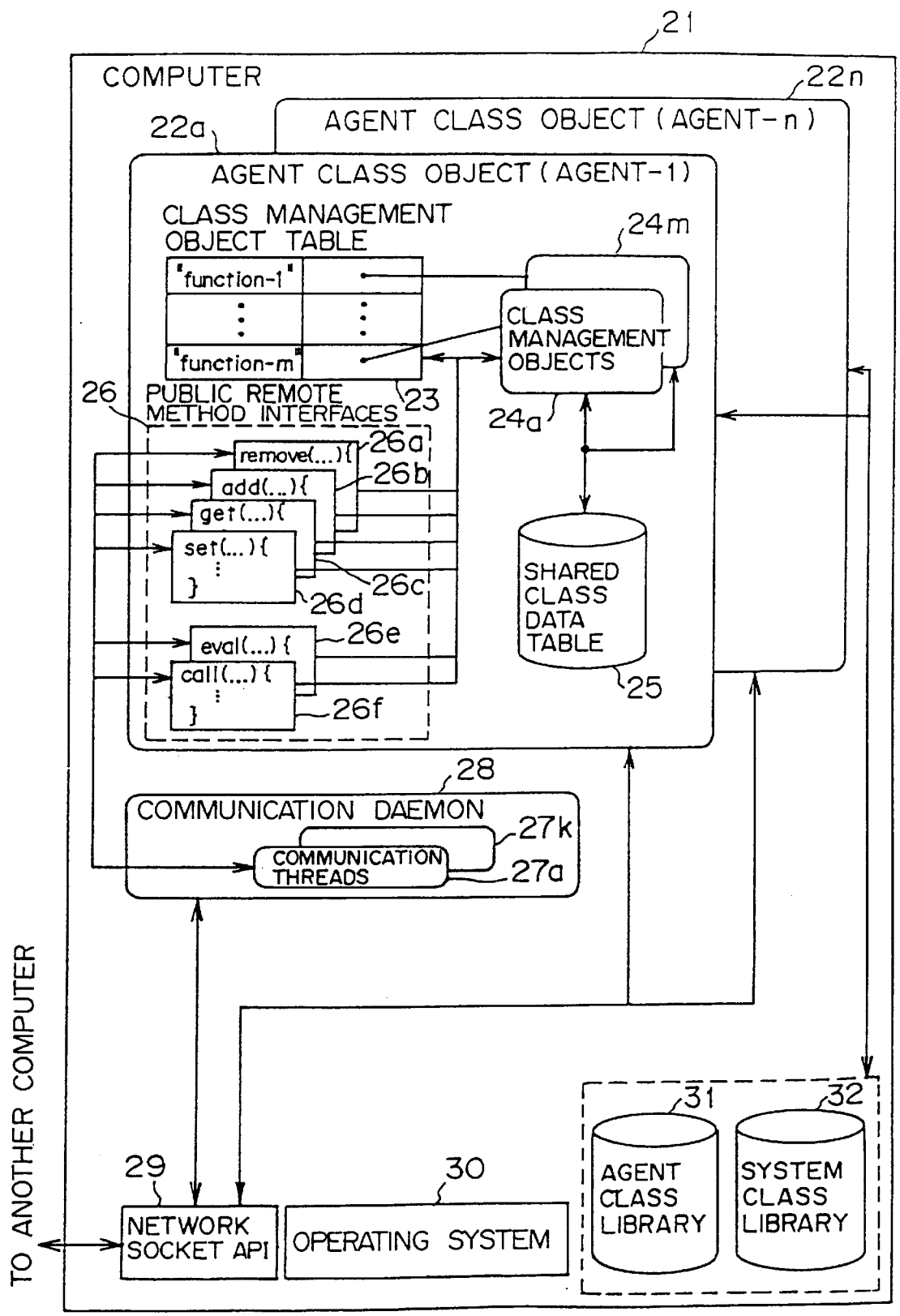
FIG. 3 is a block diagram showing the functional configuration of the computer according to an embodiment of the present invention.

FIG. 3 is a block diagram showing the functional configuration of the computer according to an embodiment of the present invention.

In FIG. 3, an agent class is provided as a basic class of a library of a development language, and the agent class is stored in an agent class library 31. When developing a system, the programmer describes an application by generating a subclass based on an agent class as a basic class.

An agent class includes a class management object table 23 for storing the correspondence between class management objects 24a through 24m and the names of the class management objects 24a through 24m; the class management objects 24a through 24m for managing class data added to agent class objects 22a through 22n; a shared class data table 25 for storing the class data managed by the class management objects 24a through 24m; and public remote method interfaces 26 for performing a process on class data.

The agent class objects 22a through 22n are generated in a computer 21 as instances of an agent class stored in the agent class library 31. For example, the names function-1 through function-m of the class management objects 24a through 24m are registered in the class management object table 23 of the agent class object 22a. Simultaneously, the pointers to the class management objects 24a through 24m respectively corresponding to the names function-1 through function-m are stored therein.

For example, a remove ( ) method 26a, an add ( ) method 26b, a get ( ) method 26c, a set ( ) method 26d, an eval ( ) method 26e, and a call ( ) method 26f are provided as the public remote method interfaces 26 for the agent class object 22a.

The remove ( ) method 26a deletes class data from the shared class data table 25 using as arguments the names of the class management objects 24a through 24m which manage class data to be deleted.

The add ( ) method 26b newly generates the class management objects 24a through 24m which manage class data to be added using as arguments the class data to be added and the names of the class management objects 24a through 24m which manage the class data to be added. simultaneously, the add ( ) method 26b registers the names of the class management objects 24a through 24m in the class management object table 23, and stores the class data to be added in the shared class data table 25.

The get ( ) method 26c copies class data from the shared class data table 25 using as arguments the names of the class management objects 24a through 24m which manage class data to be fetched.

The set ( ) method 26d replaces class data to be replaced in the shared class data table 25 with new class data using as arguments new replacing class data and the names of the class management objects 24a through 24m which manage the class data to be replaced.

The eval ( ) method 26e performs a remote process on class data or the object of the class data using as arguments class data to be processed and serialized data of an object of the class data.

The call ( ) method 26f generates an object from class data stored in the shared class data table 25 using as arguments the names of the class management objects 24a through 24m which manage the class data to be processed.

The computer 21 includes a communication daemon 28; a network socket API (application programming interface) 29; an operating system 30; and a system class library 32.

When the public remote method interface 26 is invoked, communication threads 27a through 27k are assigned, and there can be a plurality of execution flows (for example, methods and functions) performed in parallel in a program with a data area shared among them. The multiple thread function is a standard function in the Java language, etc.

The communications of information among the agent class objects 22a through 22n in the computer 21 and the communications of information between the computer 21 and another computer are established through a network socket API.

The class replacement function and the remote execution function of the agent class objects 22a through 22n are applied to an actual system as, for example, a remote maintenance of software. Using these class replacement function and the remote execution function, software can be remotely replaced without stopping a server, and these functions can be used on a plurality of servers in a batch process.

Therefore, when a program is amended with only a part of server software replaced, it is not necessary to stop the server and then reactivate it after the program is amended. Especially when a distributed system is adopted, the load of an administrator can be considerably reduced. Actually, a general application can be flexibly customized by generating a class operating in the agent class objects 22a through 22n.

Thus, according to the embodiment shown in FIG. 3, when a plurality of agent class objects 22a through 22n are linked and the active agent class objects 22a through 22n receive an addition request or a deletion request for the class data which is a program code forming the agent class objects 22a through 22n, the shared class data table 25 is provided in each of the agent class objects 22a through 22n to generate the class management objects 24a through 24m each time an addition request is issued.

When the class management objects 24a through 24m manage the search in the shared class data table 25 and the execution and deletion of an added class group, the added class group can be shared and a partial class group can be dynamically deleted and updated.

Furthermore, by replacing a program or remotely executing a part of a program in a run time environment, flexible linkage and dynamic load balancing can be realized in a distributed network management system, a distributed network service, a distributed groupware, etc.

Furthermore, a program code of an active server object can be added and updated during the operation of the server object, and a server object associated with an updated service does not have to be completely stopped. As a result, a service can be stopped for a considerably short time.

An agent refers to an object provided with a function of monitoring class data forming the object.

Figure 4:
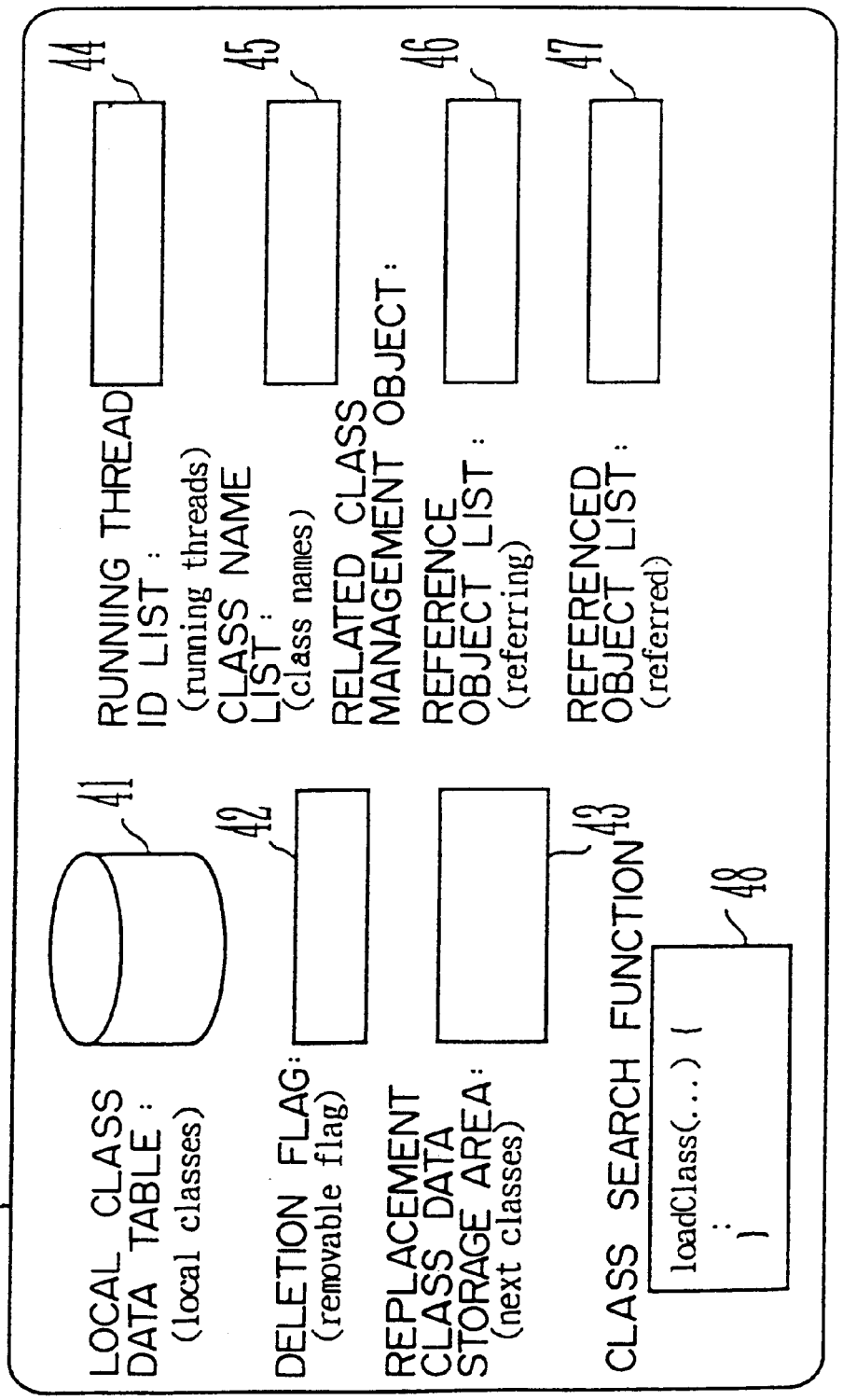
FIG. 4 shows an example of the configuration of the class management object shown in FIG. 3.

FIG. 4 shows an example of the configuration of the management object shown in FIG. 3.

In FIG. 4, the class management objects 24a through 24m includes a local class data table (local classes) 41; a deletion flag (removable flag) 42; a replacement class data storage area (next classes) 43; a running thread ID list (running threads) 44; a class name list (class names) 45; a reference object list (referring) 46; a referenced object list (referred) 47; and a class search function 48 for retrieving class data.

The local class data table 41 stores class data received during the remote execution of the program. That is, when the class data is transmitted from any of other agent class objects 22a through 22n during the remote execution, the local class data table 41 stores the class data independently of the class data already managed by the class management objects 24a through 24m, thereby avoiding the conflict between the transmitted class data and the class data already managed by the class management objects 24a through 24m when the class data is remotely processed.

The deletion flag 42 indicates whether or not a request to delete class data added to the shared class data table 25 has been issued. The request to delete the class data can be accepted even when the class data specified by the deletion request is being used by storing the request to delete the class data in the deletion flag 42.

The replacement class data storage area 43 temporarily stores newly replacing class data when a request to replace class data added to the shared class data table 25. The request to replace the class data can be accepted even when the class data specified by the request to replace the class data is being used by storing the new class data in the replacement class data storage area 43 at the issue of a replacement request.

The running thread ID list 44 stores a thread ID which is processing class data added to the shared class data table 25. It can be determined by storing the thread ID in the running thread ID list 44 and referring to the running thread ID list 44 whether or not the class data exists.

The class name list 45 stores each class name of class data added to the shared class data table 25. The class data managed by the class management objects 24a through 24m can be checked, and a process can be performed for each piece of the class data managed by the class management objects 24a through 24m.

The reference object list 46 shows which one of the class management objects 24a through 24m manages the class data utilized by the class data added to the shared class data table 25. The reference object list 46 enables a process on the class data to be performed in consideration of referenced class data.

The referenced object list 47 shows which one of the class management objects 24a through 24m manages class data utilizing other class data, and a process can be performed on class data in consideration of the referencing class data.

Figure 5:
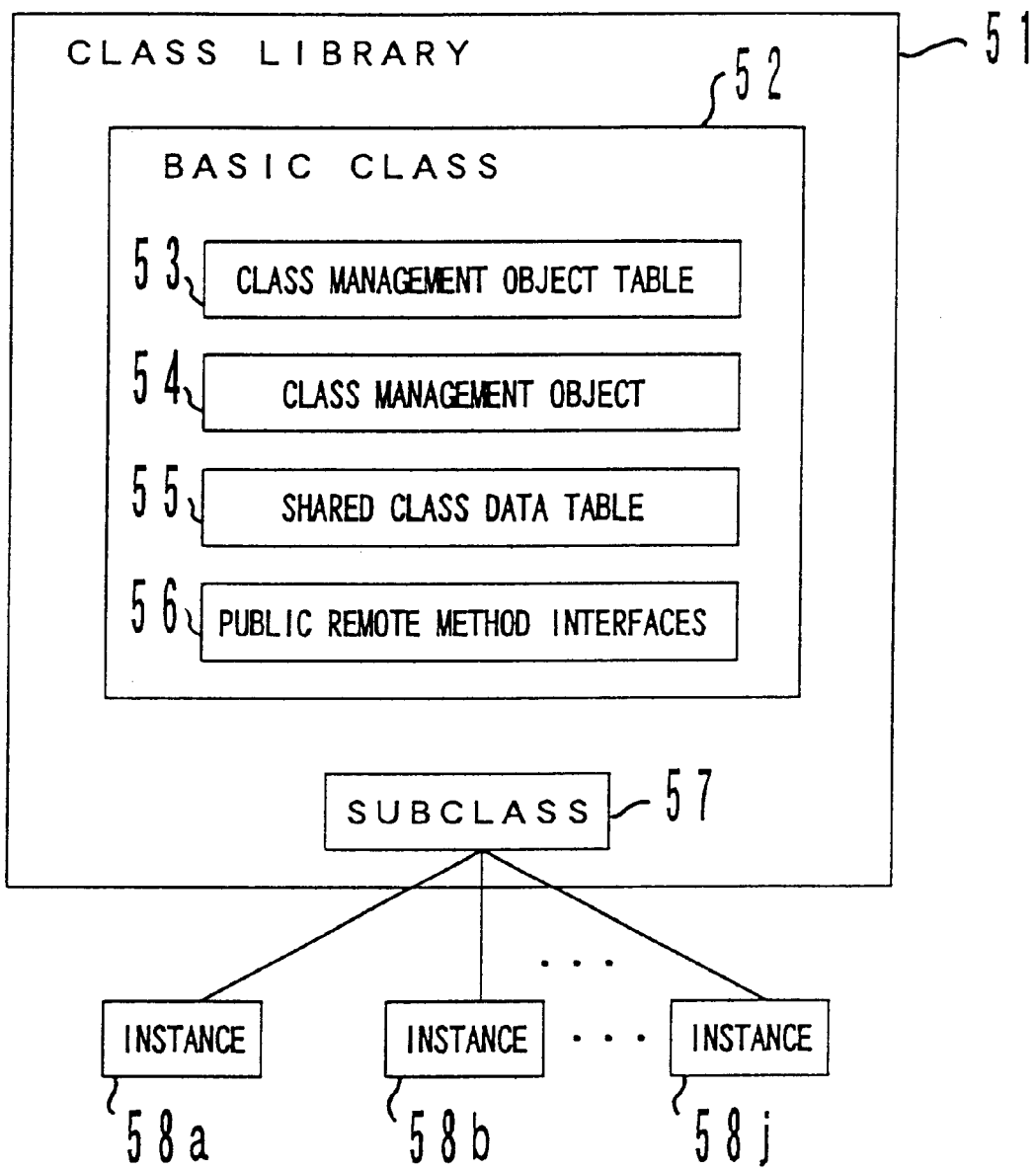
FIG. 5 shows an example of the configuration of an agent class.

FIG. 5 shows an example of the configuration of the agent class.

An agent class is provided as a basic class 52 of a class library 51. The basic class 52 includes a class management object table 53, a class management object 54, a shared class data table 55, and a public remote method interface 56. A subclass 57 generated from the basic class 52 is registered in the class library 51, and the agent class objects 22a through 22n can be generated as instances 58a through 58j from the subclass 57.

Thus, a developer of a distributed system can realize the function of replacing class data in a run time environment by generating the subclass 57 of an agent class and describing an application without special knowledge about class management, and can generate a flexible system using a remote execution function by transmitting class data from external agent class objects 22a through 22n.

Figure 6:
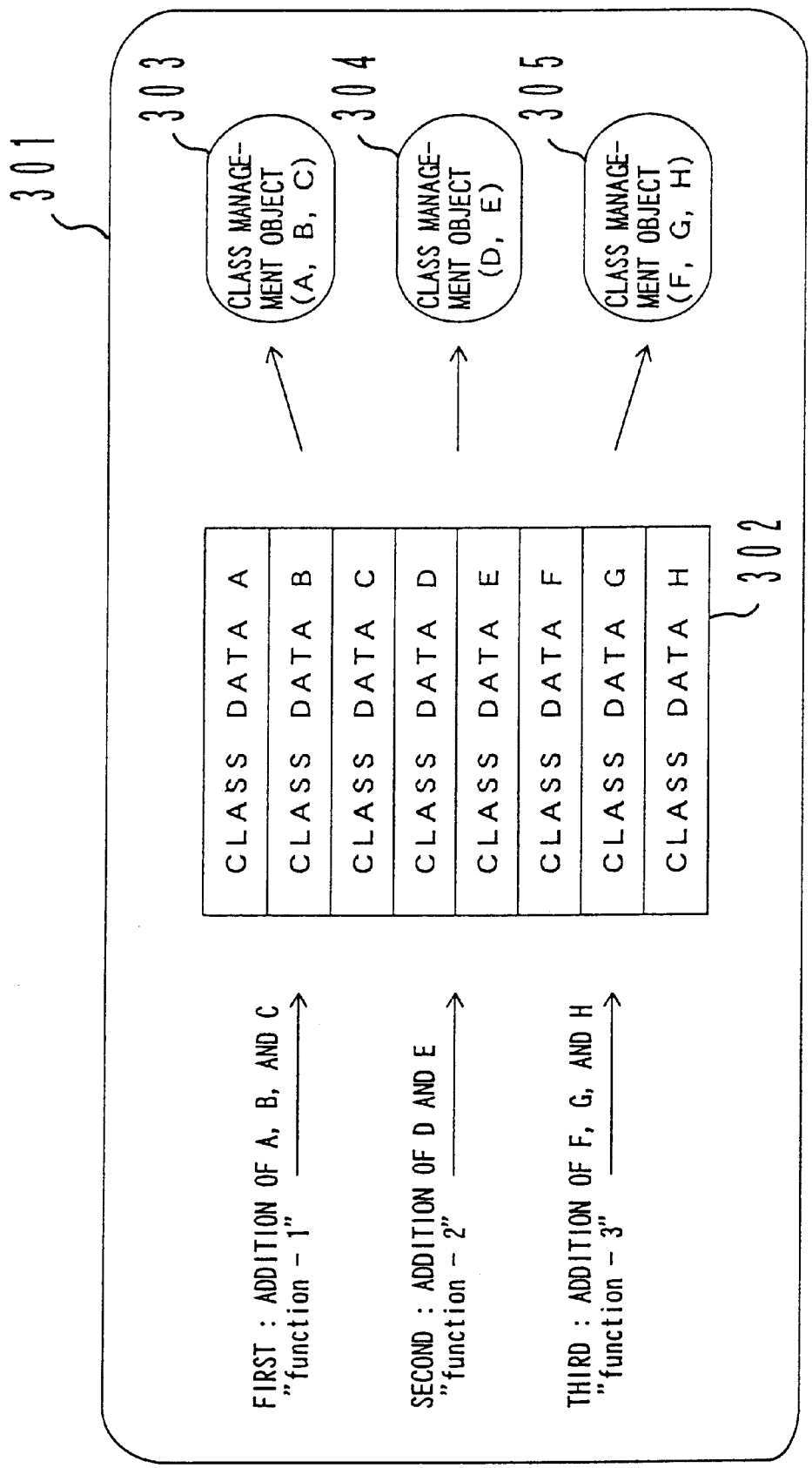
FIG. 6 shows a method of generating a class management object when class data is added.

FIG. 6 shows a method of generating a class management object when class data is added.

In FIG. 6, for example, when class data A, class data B, and class data C are added to an agent class object 301 using the name 'function-1', they are stored in a shared class data table 302, and simultaneously a class management object 303 for managing the class data A, B, and C is generated.

The class names of the class data A, B, and C managed by the class management object 303 are registered in the class management object 303, and 'function-1' is registered as the name of the class management object 303 in the class management object table.

If class data D and E are added as the name 'function-2' to the agent class object 301 after the class data A, B, and C are added to the agent class object 301, the class data D and E are stored in the shared class data table 302, and a class management object 304 for managing the class data D and E is newly generated.

The class names of the class data D and E managed by the class management object 304 are registered in the class management object 304, and 'function-2' is registered as the name of the class management object 304 in the class management object table.

If class data F, G, and H are added as the name 'function-3' to the agent class object 301 after the class data D and E are added to the agent class object 301, the class data F, G, and H are stored in the shared class data table 302, and a class management object 305 for managing the class data F, G, and H is newly generated.

The class names of the class data F, G, and H managed by the class management object 305 are registered in the class management object 305, and 'function-3' is registered as the name of the class management object 305 in the class management object table.

Thus, each time a function formed by class data is added to the agent class object 301, the class management objects 303 through 305 are generated. As a result, a program can be monitored for each function formed by class data, and it can be determined which function of the program is being used during the operation of the program. Therefore, the function of a part of the program can be deleted or replaced during the operation of the program.

Furthermore, if the names 'function-1' through 'function-3' of the class management objects 303 through 305 are registered in the class management object table, the programmer can specify the function added to a program by specifying the names 'function-1' through 'function-3' of the class management objects 303 through 305, thereby improving the convenience in customizing the program.

Described below is the method of customizing the application according to an embodiment of the present invention.

Figure 7:
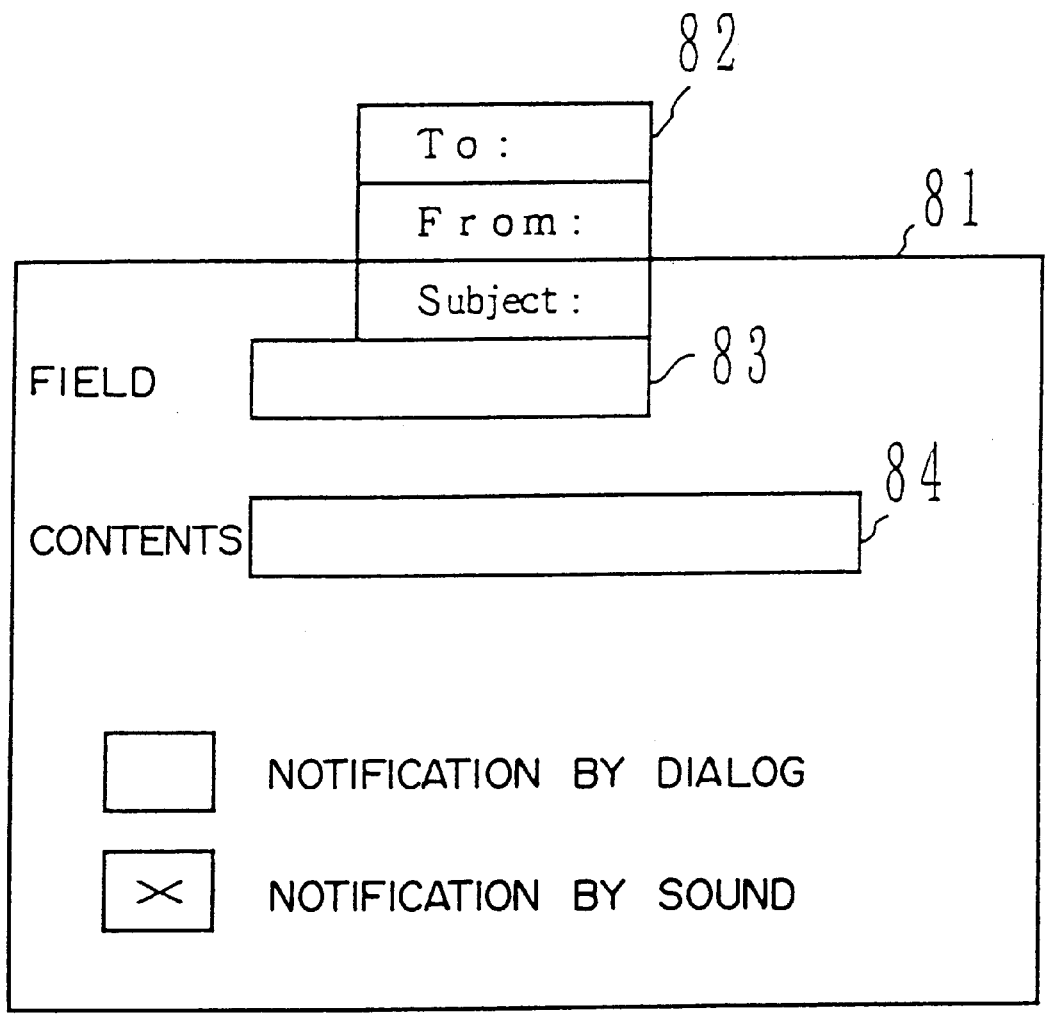
FIG. 7 shows an example of coding a template.

FIG. 7 shows an example of coding a template.

Assume that, in FIG. 7, for example, the application for screening the E-mail arrival notification is provided in a template (model) format using an initialization file. The template is used to screen the arrival notification about the mail from a specified sender. Selecting 'From' from a pop-up menu 82 of a field column 83 of an initialization menu 81 and inputting the name of the sender through the keyboard sets the name of the sender in a contents column 84.

On the other hand, when a keyword is to be retrieved from the body of the E-mail and screened, it cannot be successfully retrieved only through the functions provided by the template shown in FIG. 7. Therefore, a program code for searching the text of the E-mail for a keyword is obtained externally. Then, the program code for the portion of the arrival notification of the E-mail provided by the template shown in FIG. 7 is replaced with the program code for retrieving a keyword of the text of the E-mail.

When a program code is replaced, the class management objects 24a through 24m monitor the utilization of a program code for a portion of the arrival notification of E-mail. This allows the program code to be replaced when the program code for the portion of the arrival notification of E-mail is not executed. Therefore, when the template shown in FIG. 7 is customized, a part of the function of the program in the template format shown in FIG. 7 can be replaced without stopping the operation of the program in the template format shown in FIG. 7.

Thus, a program to be customized is operated and a program code required for an application to be established can be retrieved for replacement by coding the template and monitoring the program code for each function. Therefore, an application can be flexibly customized without limitations from the current template.

Figure 8:
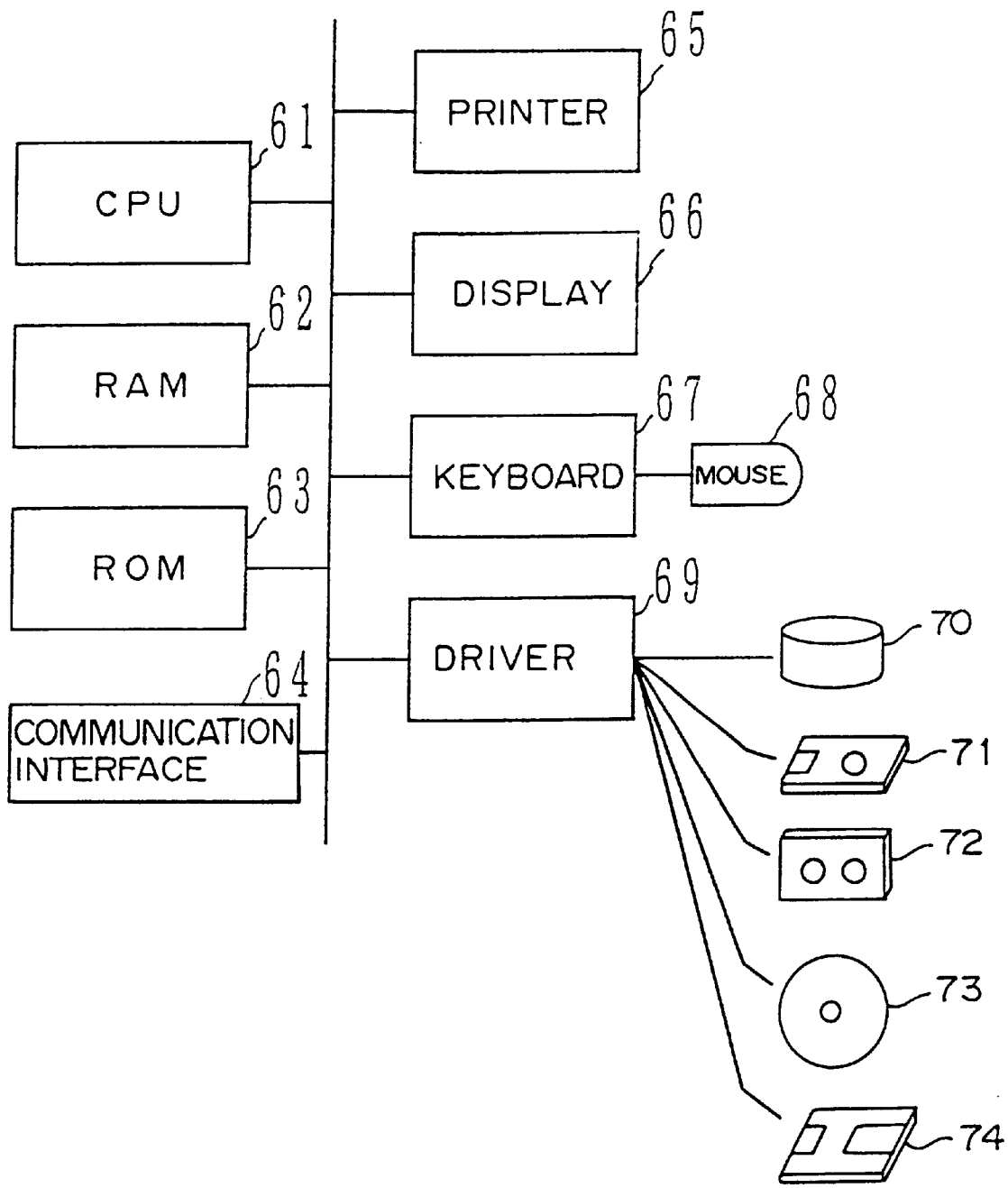
FIG. 8 shows an example of the system configuration of the computer shown in FIG. 3.

FIG. 8 shows an example of the system configuration of the computer shown in FIG. 3.

In FIG. 8, a CPU 61, a RAM 62, a ROM 63, a communication interface 64, a printer 65, a display 66, a keyboard 67, a mouse 68, and a driver 69 are interconnected. For example, a hard disk 70, a floppy disk 71, a magnetic tape 72, an optical disk 73 such as a CD-ROM, a DVD-ROM, etc., and an IC memory card 74 are connected to the driver 69.

An agent class is stored in the ROM 63, the hard disk 70, the floppy disk 71, the magnetic tape 72, the optical disk 73 such as a CD-ROM, DVD-ROM, etc., the IC memory card 74, etc. When the agent class objects 22a through 22n are activated from the agent class, the agent class objects 22a through 22n are generated under the control of the CPU 61 and stored in the RAM 62. The operations on the agent class objects 22a through 22n are performed by operating the screen in the template format shown on the display 66 or inputting data through the keyboard.

Furthermore, a program can be transmitted or received through the communication interface 64. The communication network connected to the communication interface 64 can be, for example, a LAN (local area network), a WAN (wide area network), the Internet, an analog telephone network, a digital telephone network (ISDN: integrated services digital network), and a wireless communication network used in a PHS (personal handy system), etc.

Figure 9:
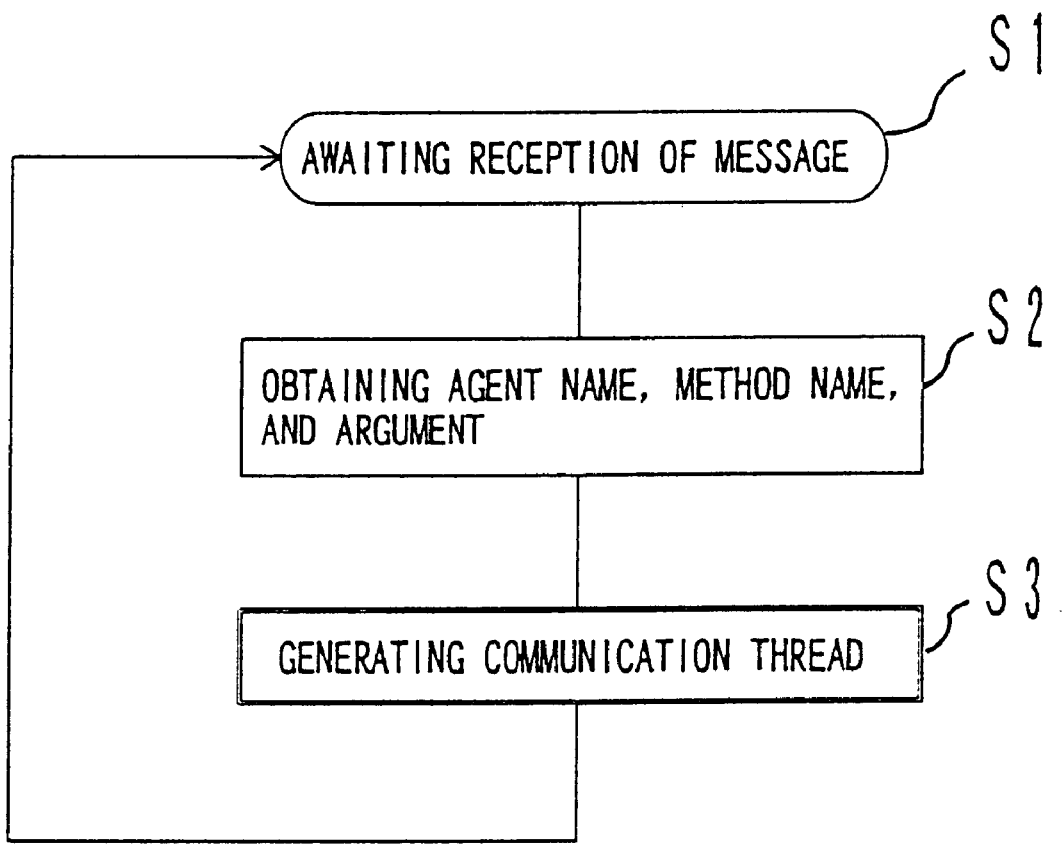
FIG. 9 is a flowchart showing an operation of the communication daemon shown in FIG. 3.

FIG. 9 is a flowchart showing the operations of the communication daemon 28 shown in FIG. 3.

In FIG. 9, when the communication daemon 28 receives a message from another computer through the network socket API 29 in a state of waiting for a message (step S1), the names AGENT-1 through AGENT-n of the destination agent class objects 22a through 22n, a method name, and an argument are obtained from the message (step S2), and the communication threads 27a through 27k are generated (step S3). Then, the data obtained from the other computer is passed to the communication threads 27a through 27k.

Figure 10:
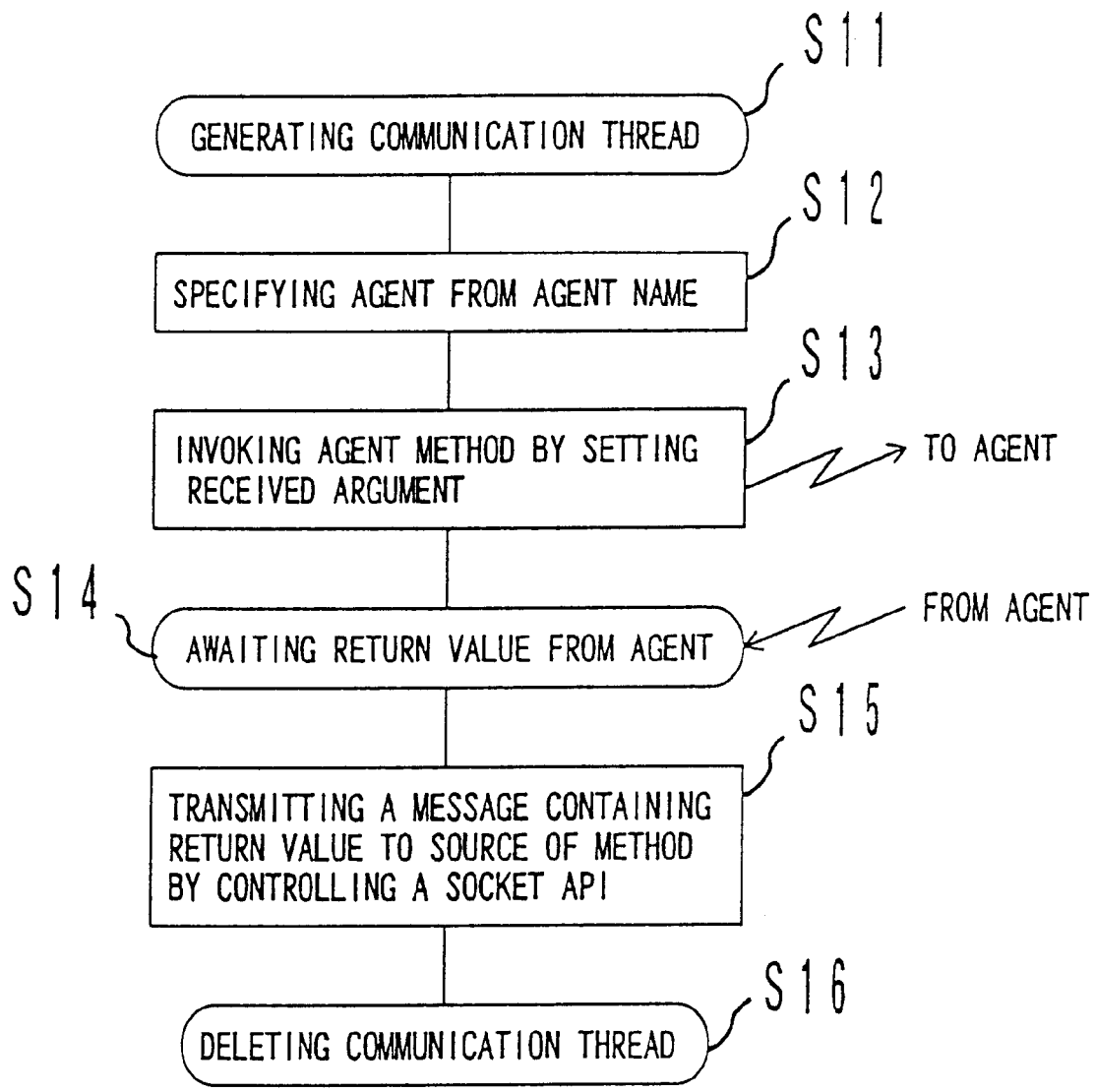
FIG. 10 is a flowchart showing an operation of the communication thread shown in FIG. 3.

FIG. 10 is a flowchart showing the operations of the communication threads 27a through 27k shown in FIG. 3.

In FIG. 10, when the communication threads 27a through 27k are generated from the communication daemon 28 (step S11), the agent class objects 22a through 22n are specified by the names AGENT-1 through AGENT-n of the agent class objects 22a through 22n specified by the communication daemon 28 (step S12).

Next, the communication threads 27a through 27k calls the public remote method interface 26 for the specified agent class objects 22a through 22n by setting an argument transmitted from the communication daemon 28 (step S13), and awaits a return value from the agent class objects 22a through 22n (step S14).

Upon receipt of a return value of the public remote method interface 26 from the agent class objects 22a through 22n, the communication threads 27a through 27k control the network socket API 29 to return a message containing the return value to an agent class object of another computer which issued the public remote method interface 26 (step S15), and delete the communication threads 27a through 27k (step S16).

Described below is the method of adding class data to the agent class objects 22a through 22n.

Figure 11:
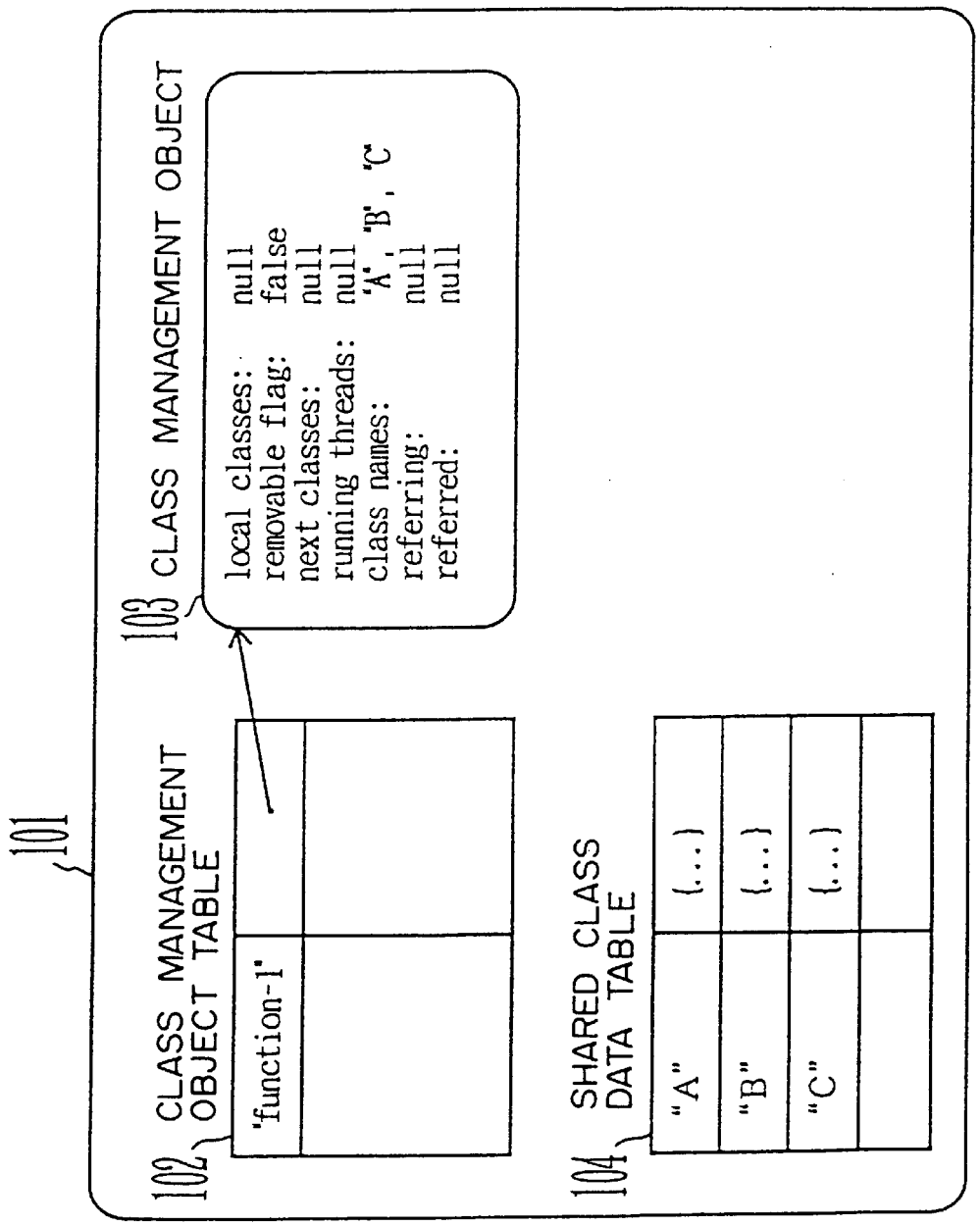
FIG. 11 shows the state in which class data is added to an agent class object.

FIG. 11 shows the state in which class data is added to an agent class object.

In FIG. 11, for example, when a function comprising the class data A, B, and C is added to an agent class object 101 using the name 'function-1', the class data A, B, and C are stored in a shared class data table 104, and a class management object 103 for managing the class data A, B, and C is generated. The 'function-1' is registered as the name of the class management object 103 in a class management object table 102. Corresponding to the name 'function-1' of the class management object 103, a pointer to the class management object 103 is generated in the class management object table 102.

The class names A, B, and C of the respective class data A, B, and C managed by the class management object 103 are registered in the class name list (class names) of the class management object 103, and a deletion flag (removable flag) is set FALSE. The local class data table (local classes), the replacement class data storage area (next classes), the running thread ID list (running threads), the reference object list (referring), and the referenced object list (referred) are null.

Figure 12:
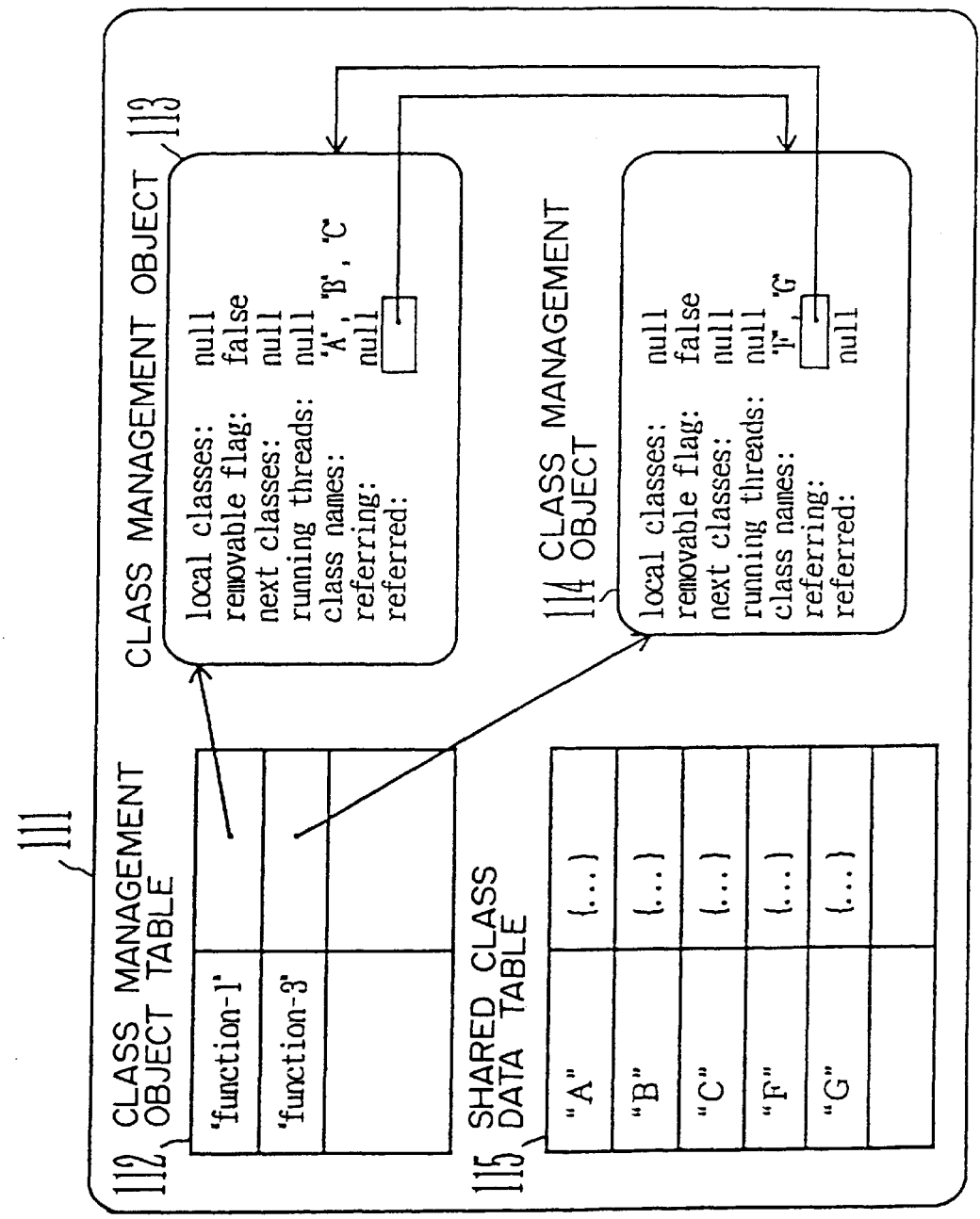
FIG. 12 shows the state in which referenced class data is added to an agent class object.

FIG. 12 shows the state in which class data having reference relationship is added to an agent class object.

In FIG. 12, for example, the function comprising the class data A, B, and C is added as the name 'function-1' to an agent class object 111. The class data A, B, and C are stored in a shared class data table 115, and a class management object 113 for managing the class data A, B, and C is generated.

The class names A, B, and C of the respective class data A, B, and C managed by the class management object 113 are registered in the class name list (class names) of the class management object 113, and a deletion flag (removable flag) is set FALSE. The local class data table (local classes), the replacement class data storage area (next classes), the running thread ID list (running threads), and the reference object list (referring) are null.

The 'function-1' is registered as the name of the class management object 113 in a class management object table 112. Corresponding to the name 'function-1' of the class management object 113, a pointer to the class management object 113 is generated in the class management object table 112.

In this state, when a function comprising the class data F and G is added to an agent class object 111 using the name 'function-3', the class data F and G are added to a shared class data table 115.

Then, a class management object 114 for managing the class data F and G is newly generated. The 'function-3' is registered as the name of the class management object 114 in a class management object table 112. Corresponding to the name 'function-3' of the class management object 114, a pointer to the class management object 114 is newly generated in the class management object table 112.

The class names F and G of the respective class data F and G managed by the class management object 114 are registered in the class name list (class names) of the class management object 114, and a deletion flag (removable flag) is set FALSE. The local class data table (local classes), the replacement class data storage area (next classes), the running thread ID list (running threads), and the referenced object list (referred) are null.

Assume that the class data F is based on the existence of the class data A already added to the shared class data table 115 as follows.

class F ( ) {
.
.
.
new A ( );
.
.
.
new G ( );
}

The reference object list (referring) of the class management object 114 stores the reference information about the class management object 113 for managing the referenced class data A, and the referenced object list (referred) of the class management object 113 stores the referenced information about the class management object 114 which manages the referencing class data F.

Therefore, even when the remove ( ) method 26a and the set ( ) method 26d are invoked using the name 'function-1' as an argument, and a deletion request and a replacement request for a function comprising the class data A, B, and C is issued to the agent class object 111, the class management object 113 can hold the deletion request and the replacement request for the function comprising the class data A, B, and C by checking the referenced object list. Thus, the function of the class data F which refers to the class data A can be protected against ruins.

Figure 13:
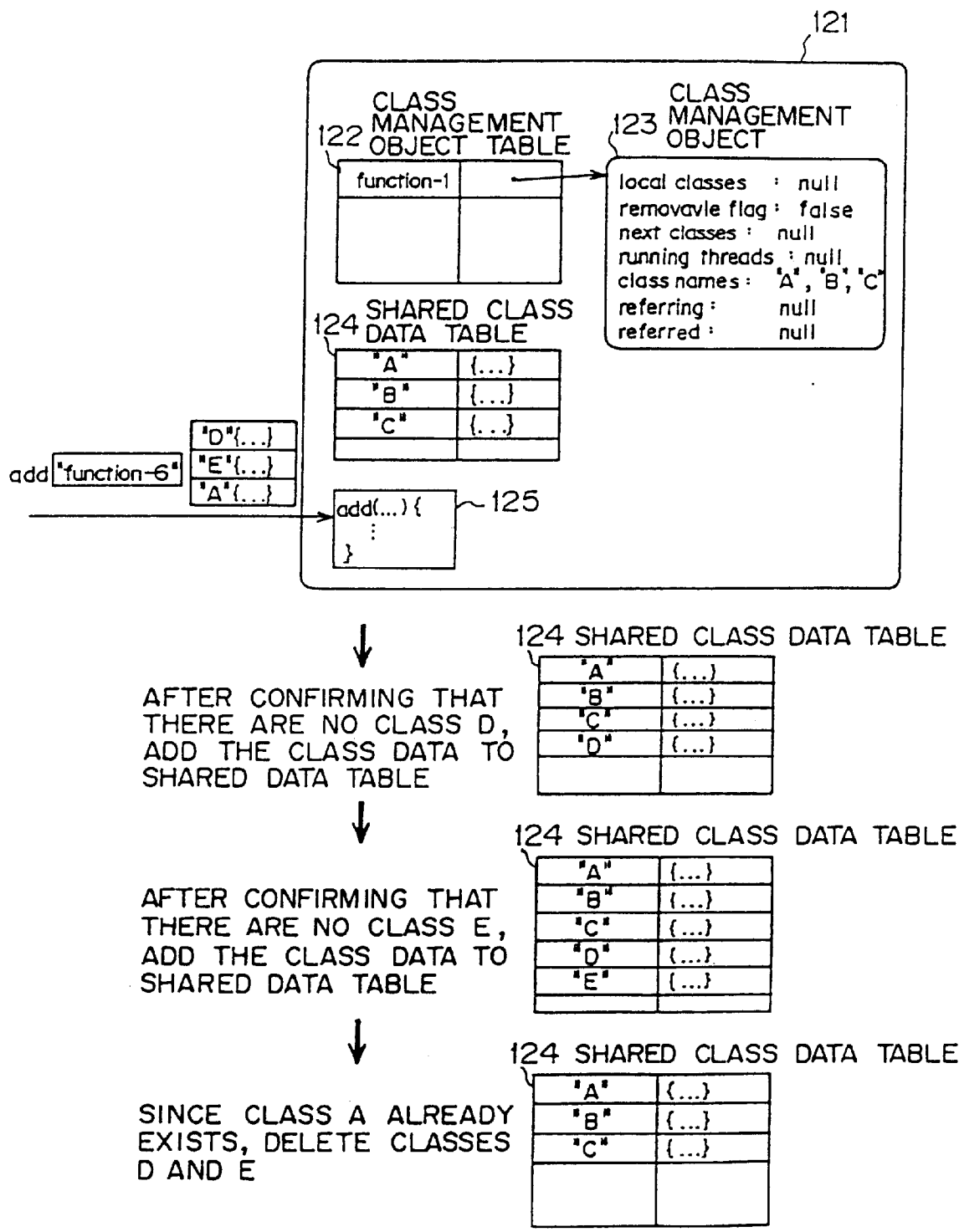
FIG. 13 shows the method of deleting an overlapping class data from an agent class object.

FIG. 13 shows the method of rejecting double registration of class data in the agent class objects 22a through 22n.

In FIG. 13, for example, a function comprising the class data A, B, and C is added to an agent class object 121 using the name 'function-1', the class data A, B, and C are stored in a shared class data table 124, and a class management object 123 for managing the class data A, B, and C is generated.

The class names A, B, and C of the respective class data A, B, and C managed by the class management object 123 are registered in the class name list (class names) of the class management object 123, and a deletion flag (removable flag) is set FALSE. The local class data table (local classes), the replacement class data storage area (next classes), the running thread ID list (running threads), the reference object list (referring), and the referenced object list (referred) are null.

The 'function-1' is registered as the name of the class management object 123 in a class management object table 122. Corresponding to the name 'function-1' of the class management object 123, a pointer to the class management object 123 is generated in the class management object table 122.

In this state, when an add ( ) method 125 of the agent class object 121 is invoked using the name 'function-6', the class data D, E, and A as arguments, the class data D is newly stored in a shared class data table 124 after confirming that the class data D is not stored in the shared class data table 124 of the agent class object 121.

Next, after confirming that the class data E is not stored in the shared class data table 124, the class data E is newly stored in the shared class data table 124.

When the class data A is stored in the shared class data table 124, the class data D and E are deleted from the shared class data table 124 because the class data A has already been stored in the shared class data table 124. The class data D, E, and A having the name 'function-6' are not stored in the shared class data table 124.

When the agent class object 121 receives a request to simultaneously add or replace plural pieces of class data, the shared class data table 124 is restored to its original state by deleting all class data to be added in the shared class data table 124 if a conflict arises between a part of the class names to be added and the class names existing in the agent class object 121 during the class data adding process.

Figure 14:
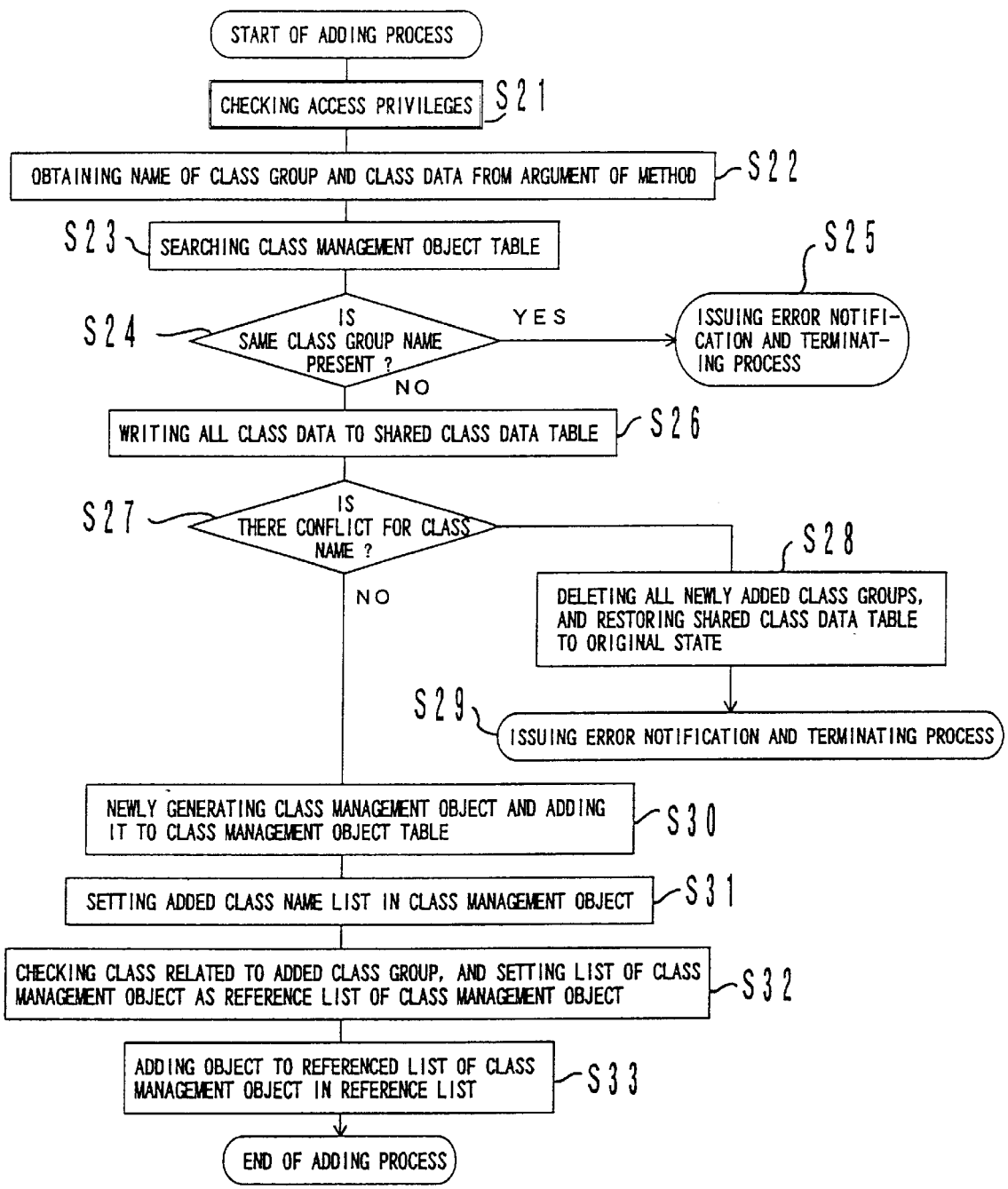
FIG. 14 is a flowchart showing a class data adding process.

FIG. 14 is a flowchart showing the class data adding process.

When the agent class objects 22a through 22n add class data, the add ( ) method 26b is invoked.

First, in FIG. 14, access privileges to the agent class objects 22a through 22n is checked (step S21). If there are no access privileges, the process is suspended.

Then, the names 'function-1' through 'function-m' assigned when the class data is added and the class data to be added are obtained from the argument of the add ( ) method 26b (step S22), and the names 'function-1' through 'function-m' assigned when the class data is added are retrieved from the class management object table 23 (step S23).

Next, it is checked whether or not the names 'function-1' through 'function-m' assigned when the class data is added exist in the class management object table 23 (step S24). If the names 'function-1' through 'function-m' assigned when the class data is added exist in the class management object table 23, an error notification is issued and the process is suspended (step S25).

On the other hand, if the names 'function-1' through 'function-m' assigned when the class data is added do not exist in the class management object table 23, the class data specified by the addition request is written to the shared class data table 25 (step S26).

Then, it is determined whether or not the same class name exists in the shared class data table 25 (step S27). If it is detected while the class data is being written that the same class name exists in the shared class data table 25, then the class data stored in the shared class data table 25 at the addition request is deleted, the shared class data table 25 is restored to its original state (step S28), an error notification is issued, and the process terminates (step S29).

On the other hand, if all class data specified at an addition request have been successfully added because the same class name does not exist in the shared class data table 25 when the class data is written, then the class management objects 24a through 24m are newly generated. The names 'function-1' through 'function-m' assigned when the class data set by the argument of the add ( ) method 26b are registered in the class management object table 23 so that the newly generated class management objects 24a through 24m can be identified by the names 'function-1' through 'function-m' registered in the class management object table 23 (step S30).

Then, the class names of all class data added to the shared class data table 25 are set in the class name list 45 of the newly generated class management objects 24a through 24m (step S31).

Next, the class related to the class data added to the shared class data table 25 is checked, destination information is set in the reference object list 46 of the newly generated class management objects 24a through 24m (step S32), and source information is set in the referenced object list 47 of the referenced class management objects 24a through 24m (step S33), thereby terminating the process.

Described below is the method of controlling access privileges according to an embodiment of the present invention.

Assume that the process for checking access privileges at the replacement of a class is reserved by the name, for example, 'CheckSet', and the following class is added to the agent class objects 22a through 22n by the name 'CheckSet'.

```
class Checkset {
    void start (RemoteAgent
    requester,
    String name,
    Object val)
    throws AccessException {
        if (!requester.get ("name").
        equals ("Admin"))
            throw new AccessException ( );
    }
}
```

Before registering the class data, access control conditions are checked using the requesting user name, the host name, and the names 'AGENT-1' through 'AGENT-n' of the agent class objects 22a through 22n, etc. to determine whether or not the request to process the class data is acceptable. That is, if the operating agent class objects 22a through 22n accept a deletion request or a replacement request for the class data, an object is generated from the class named 'CheckSet' for execution.

In this case, unless the name of the agent that has issued a class data replacement request matches 'Admin', the replacing process is not performed, but an exception occurs. Since the class describing the access control conditions, is processed in the same manner as other classes in the agent class objects 22a through 22n, the access control conditions being effective can be amended. That is, the access control conditions are managed as replaceable class data in the agent class objects 22a through 22n, and the access control conditions on the operating agent class objects 22a through 22n can be amended.

Thus, even when a program is added or updated from a remote computer, the interface is secured in adding and updating a program code, thereby reducing the load of the administrator of the maintenance and management of distributed objects.

Figure 15:
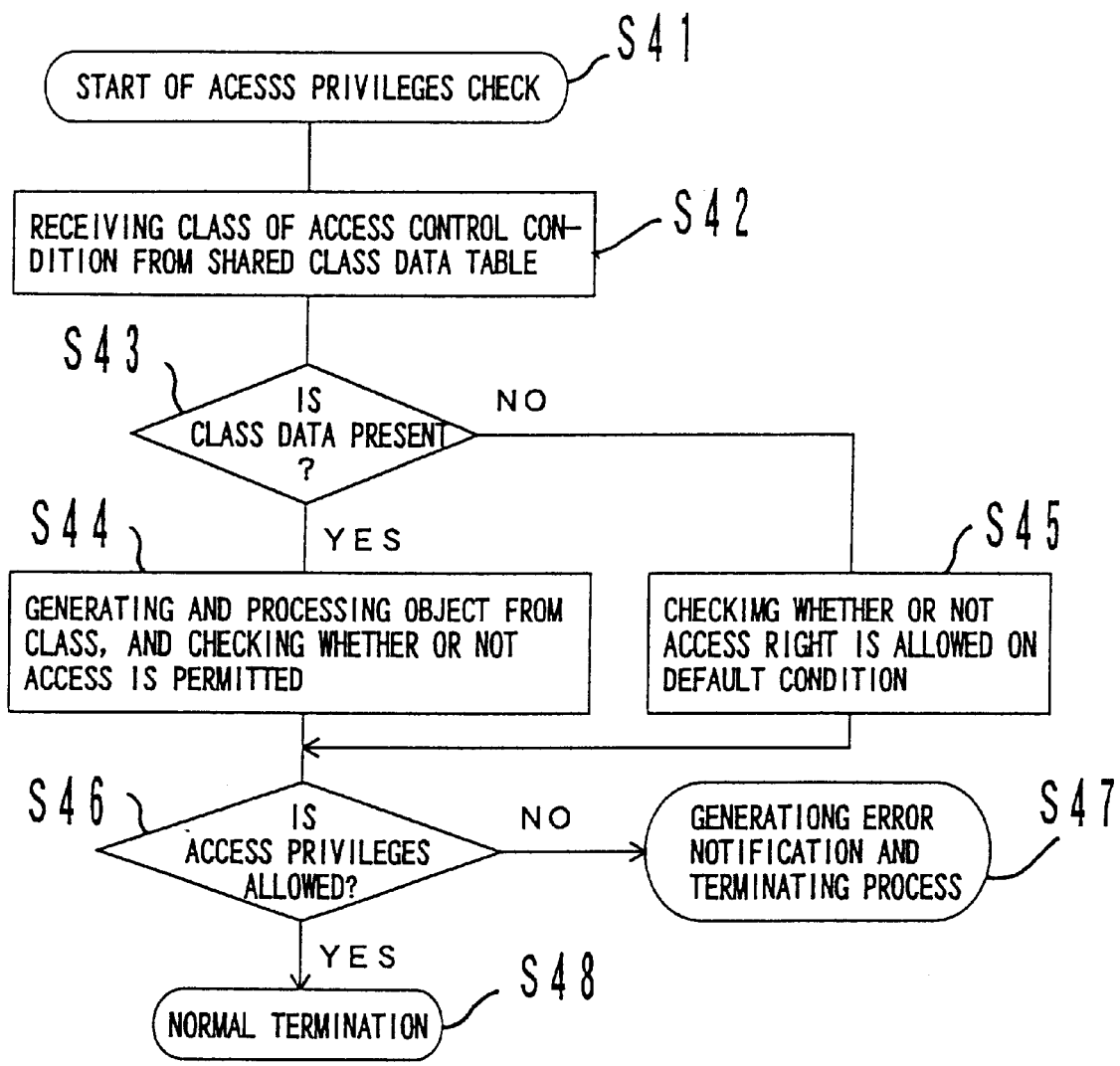
FIG. 15 is a flowchart showing an access privileges checking process.

FIG. 15 is a flowchart showing the access privileges checking process.

Figure 16:
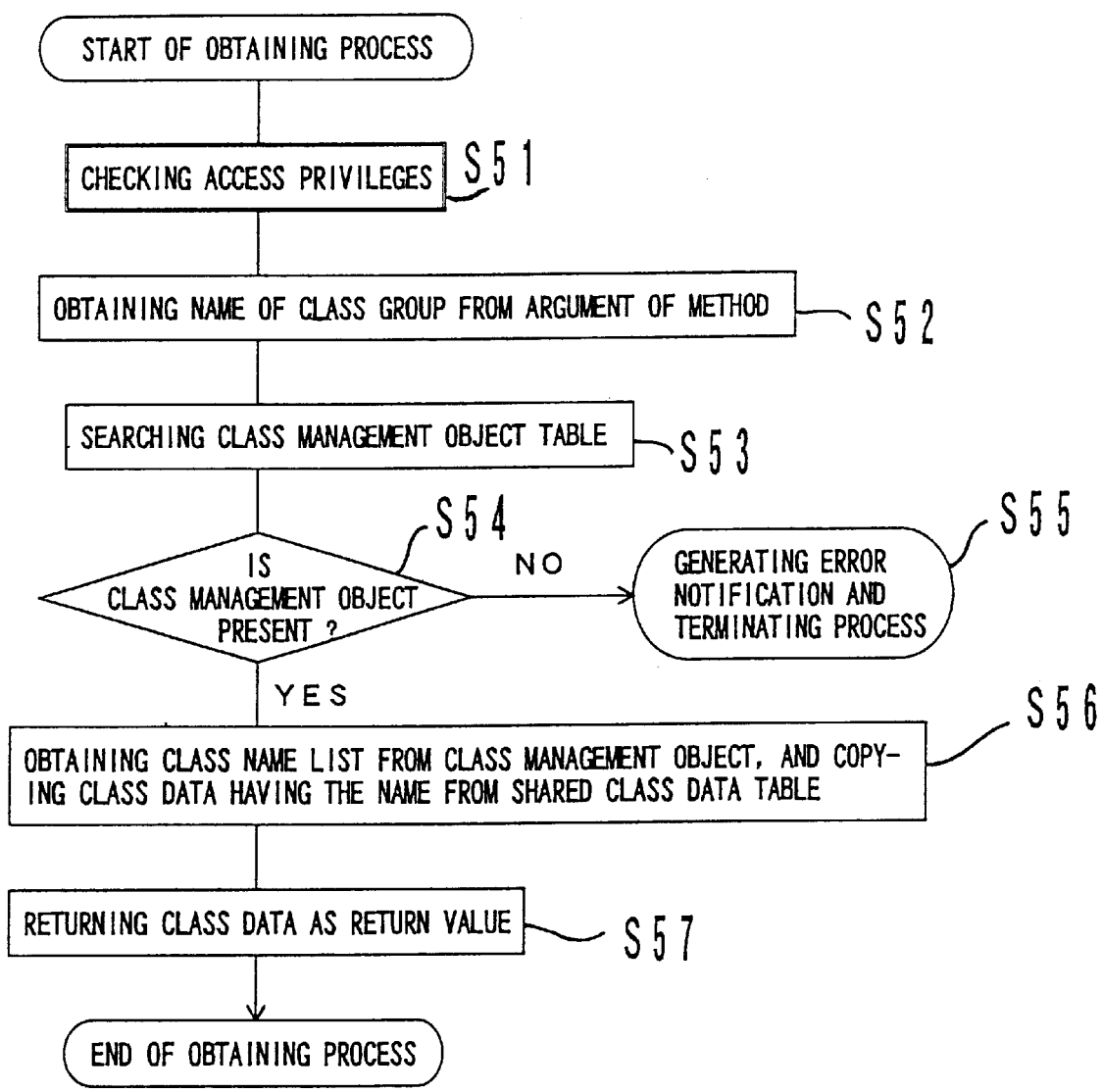
FIG. 16 is a flowchart showing a class data fetching process.
Figure 19:
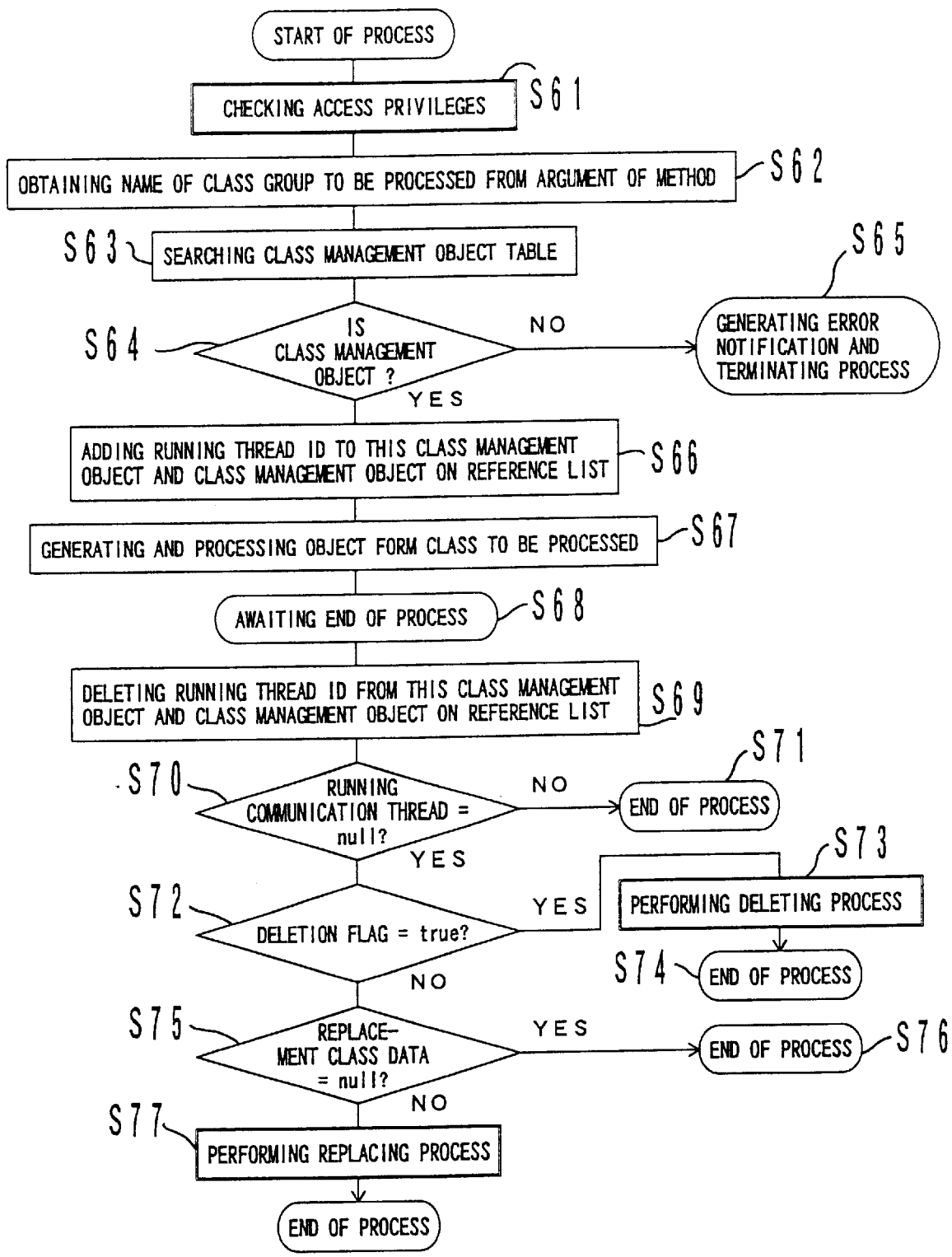
FIG. 19 is a flowchart showing a class data process.
Figure 24:
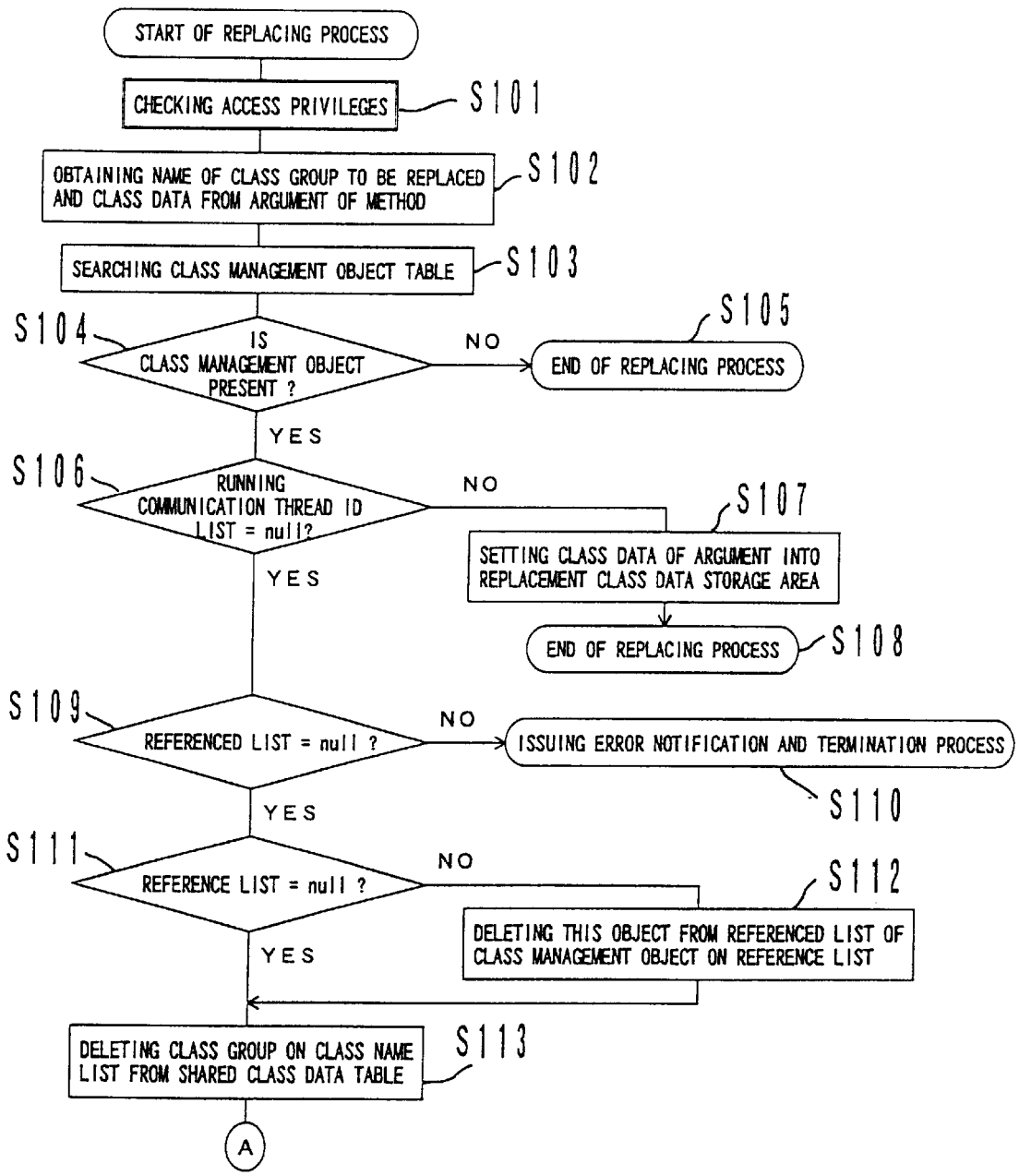
FIG. 24 is a flowchart showing a class data replacing process.
Figure 25:
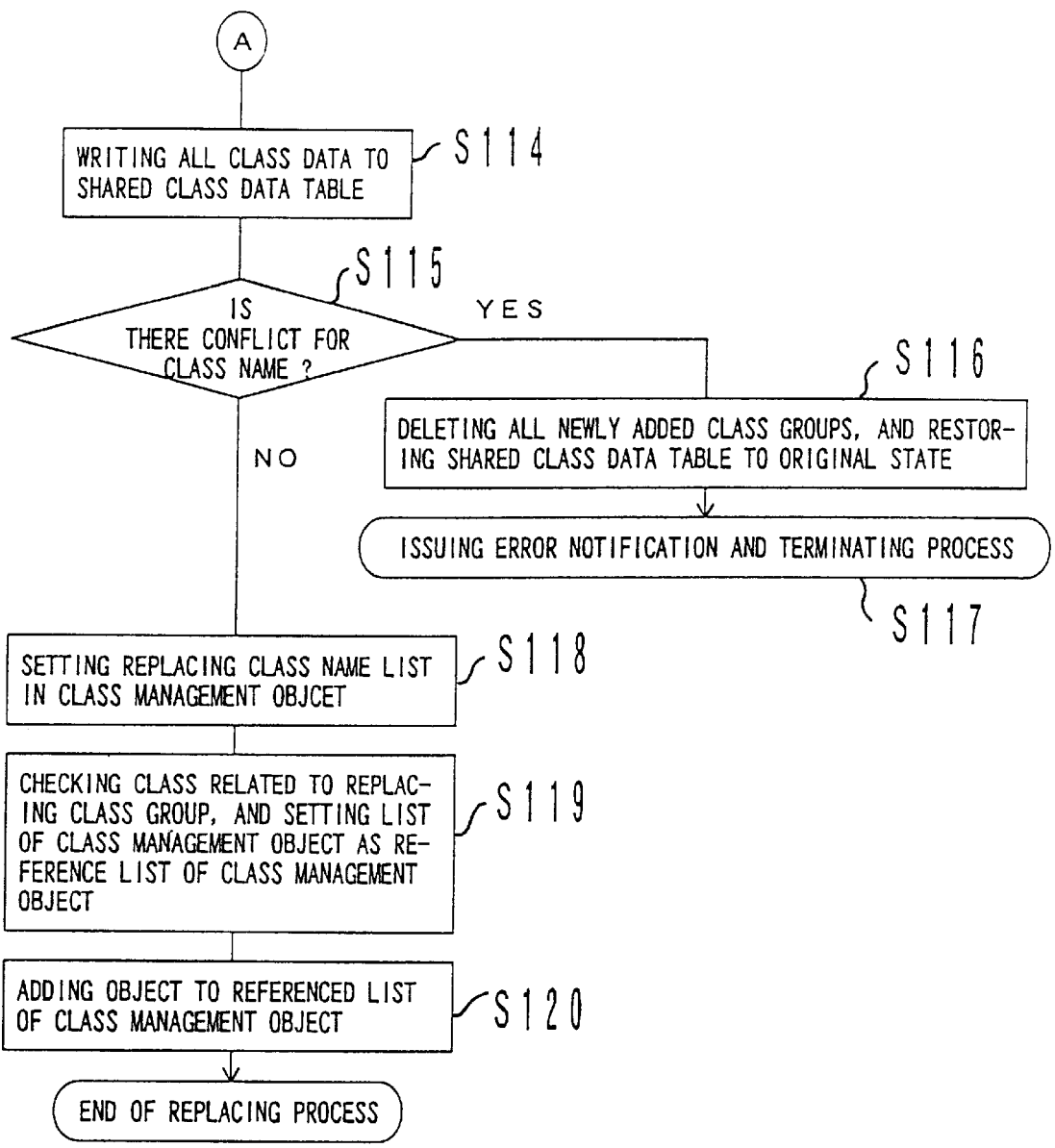
FIG. 25 is a flowchart (continued) showing a class data replacing process.
Figure 28:
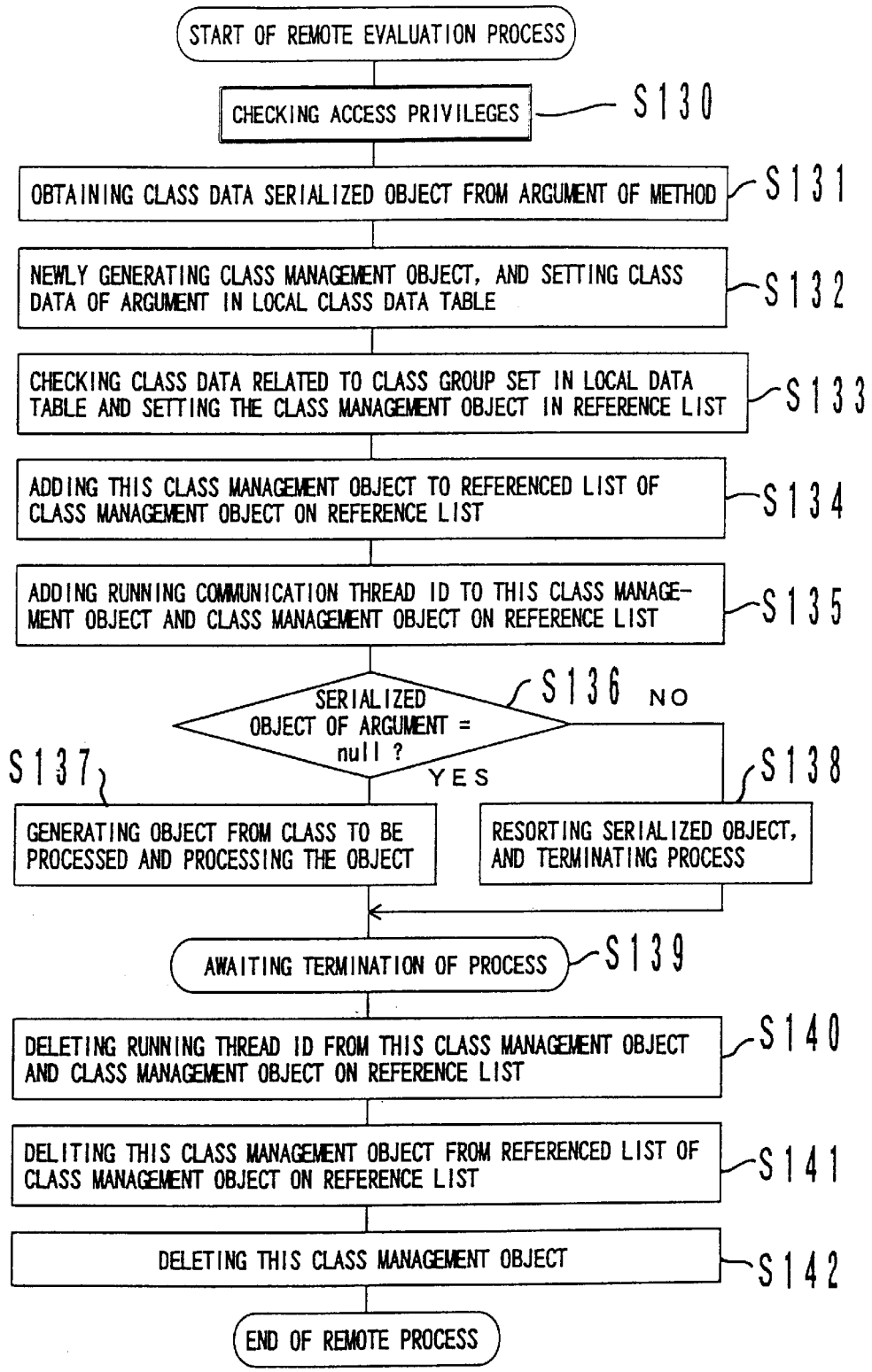
FIG. 28 is a flowchart showing a remote evaluation.

The access privileges checking process is invoked by a process of adding class data to the agent class objects 22a through 22n shown in FIG. 13; a process of obtaining the class data shown in FIG. 16; a process performed on the class data shown in FIG. 19; a process of deleting class data shown in FIG. 21; a process of replacing class data shown in FIGS. 24 and 25; and a class data remote process shown in FIG. 28.

In FIG. 15, when an access privileges check is started (step S41), the class of the access privileges check describing the access control conditions is retrieved from the shared class data table 25 (step S42). Then, it is checked whether or not the class for checking access privileges exists in the shared class data table 25 (step S43). If the class exists in the shared class data table 25, an object is generated from the class of the access privileges check for execution (step S44).

The class of the access privileges check refers to a program describing rules according to the type and argument of a process, the names AGENT-1 through AGENT-n of the agent class objects 22a through 22n, the process requesting user names, etc., and can be replaced with another class of the access privileges check during the operations of the agent class objects 22a through 22n as with other class data added to the agent class objects 22a through 22n.

Therefore, the access control conditions can be easily amended for each of the agent class objects 22a through 22n, thereby improving the security of the interface in adding and updating a program code.

On the other hand, if the class of the access privileges check does not exist in the shared class data table 25, the access privileges are checked under the default conditions (step S45).

Then, it is determined whether or not access privileges exist (step S46). If no access privileges exist, an error notification is issued (step S47) and the process terminates (step S47). If access privileges exist, the agent class objects 22a through 22n accepts a requested process (step S48).

Described below is the method of obtaining the class data from the agent class objects 22a through 22n.

FIG. 16 is a flowchart showing the process of obtaining class data.

When the agent class objects 22a through 22n performs a process of obtaining class data, the get ( ) method 26c is invoked.

In FIG. 16, access privileges are checked first on the agent class objects 22a through 22n (step S51). If no access privileges exist, the process terminates.

Next, the names 'function-1' through 'function-m' of the class management objects 24a through 24m for managing the class data to be processed are obtained from the argument of the get ( ) method 26c (step S52), and the names 'function-1' through 'function-m' of the class management objects 24a through 24m for managing the class data to be processed are retrieved from the class management object table 23 (step S53).

Then, it is checked whether or not the names 'function-1' through 'function-m' of the class management objects 24a through 24m for managing the class data to be processed are registered in the class management object table 23 (step S54). If the names 'function-1' through 'function-m' of the class management objects 24a through 24m for managing the class data to be processed are not registered in the class management object table 23, an error notification is issued and the process is suspended (step S55).

If the names 'function-1' through 'function-m' of the class management objects 24a through 24m for managing the class data to be processed are registered in the class management object table 23, then the class names are obtained from the class name list 45 of the class management objects 24a through 24m, the class data of the class name is copied from the shared class data table 25 (step S56), and the class data is returned as a return value to the requester (step S57).

Described below is the method of processing class data in the agent class objects 22a through 22n.

Figure 17:
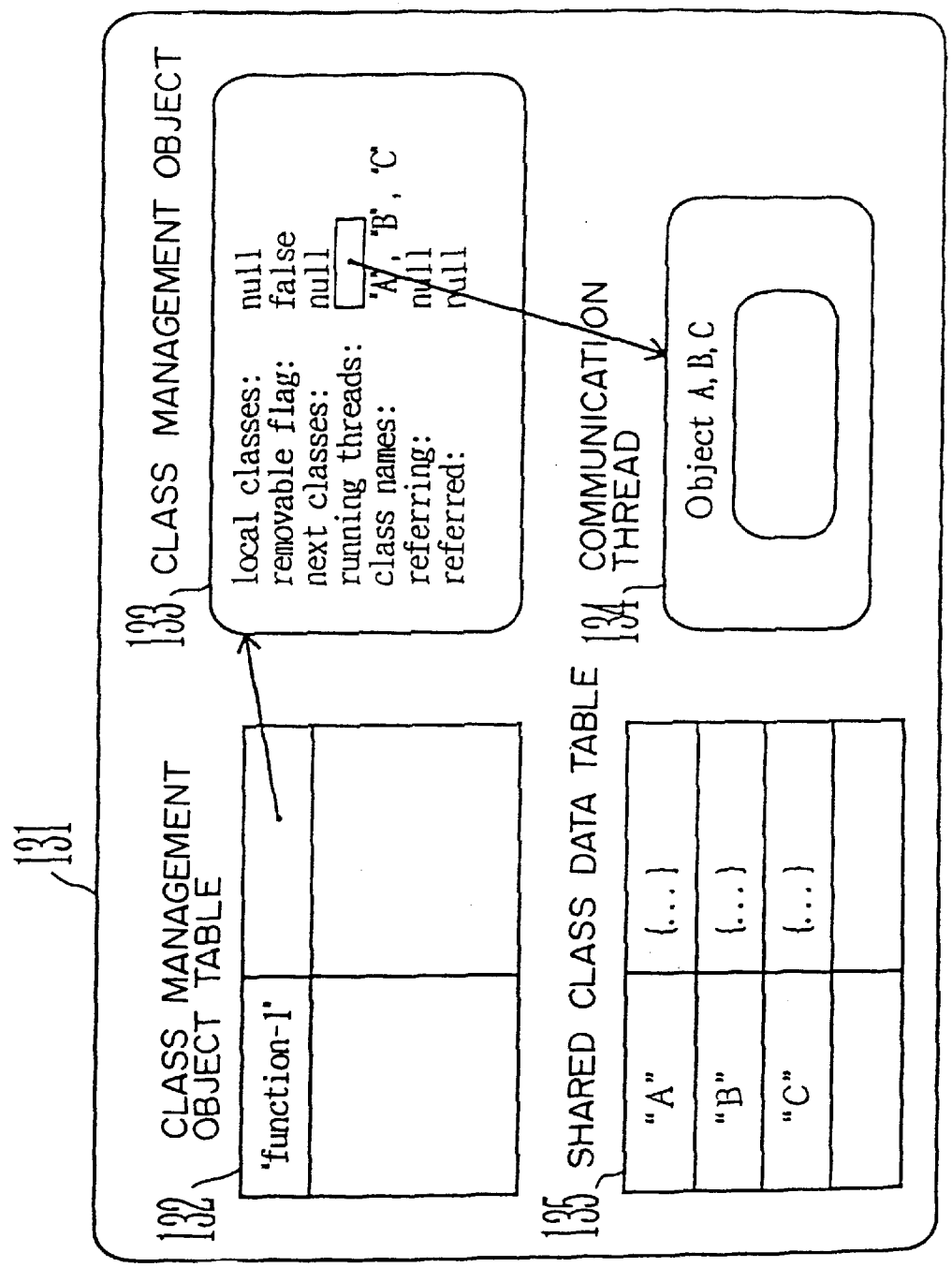
FIG. 17 shows the state of an agent class object when class data is processed.

FIG. 17 shows the state of an agent class object when the class data is processed.

In FIG. 17, for example, the function comprising the class data A, B, and C is added as the name 'function-1' to an agent class object 131. The class data A, B, and C are stored in a shared class data table 135, and a class management object 133 for managing the class data A, B, and C is generated.

The class names A, B, and C of the respective class data A, B, and C managed by the class management object 133 are registered in the class name list (class names) of the class management object 133, and a deletion flag (removable flag) is set FALSE. The local class data table (local classes), the replacement class data storage area (next classes), the reference object list (referring), and referenced object list (referred) are null.

The 'function-1' is registered as the name of the class management object 133 in a class management object table 132. Corresponding to the name 'function-1' of the class management object 133, a pointer to the class management object 133 is generated in the class management object table 132.

When a request to process the class data A, B, and C is issued to the agent class object 131 by specifying the name 'function-1', the objects A, B, and C are generated from the class data A, B, and C, and a thread 134 is assigned.

The running thread ID list (running threads) stores identification information about the thread 134 assigned to the objects A, B, and C. When the objects A, B, and C have been processed, the identification information about the thread 134 assigned to the objects A, B, and C is deleted from the running thread ID list (running threads).

Therefore, the class management object 133 can easily determine whether or not the class data A, B, and C managed by the class management object 133 are being used by referring to the running thread ID list (running threads).

Figure 18:
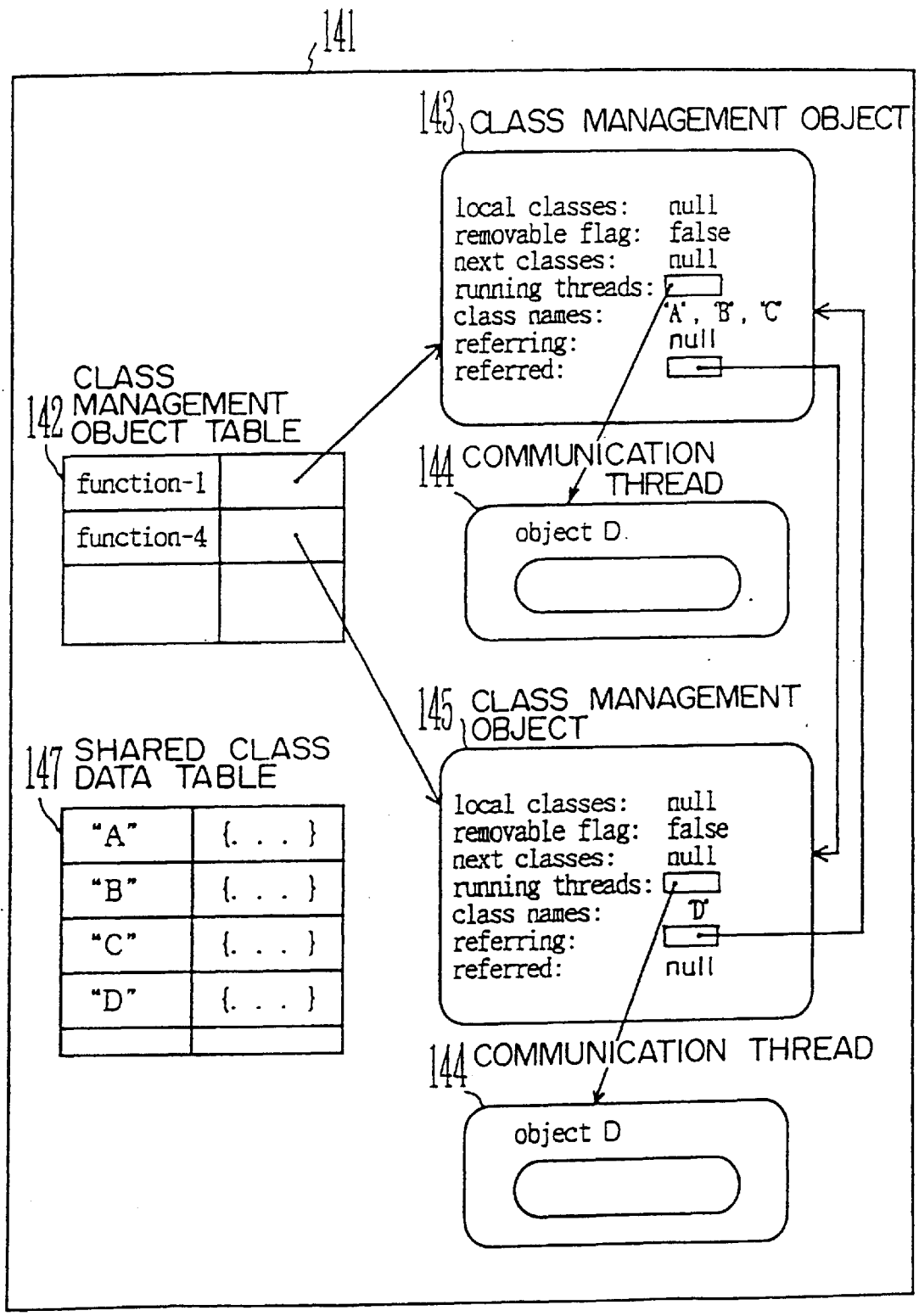
FIG. 18 shows the state of an agent class object when referenced class data is processed.

FIG. 18 shows the state of an agent class object whose class data having reference relationship is being processed.

In FIG. 18, for example, the function comprising the class data A, B, and C is added as the name 'function-1' to an agent class object 141. The class data A, B, and C are stored in a shared class data table 147, and a class management object 143 for managing the class data A, B, and C is generated.

The class names A, B, and C of the respective class data A, B, and C managed by the class management object 143 are registered in the class name list (class names) of the class management object 143, and a deletion flag (removable flag) is set FALSE. The local class data table (local classes), the replacement class data storage area (next classes), and the reference object list (referring) are null.

The 'function-1' is registered as the name of the class management object 143 in a class management object table 142. Corresponding to the name 'function-1' of the class management object 143, a pointer to the class management object 143 is generated in the class management object table 142.

The function comprising the class data D is added as the name 'function-4' to an agent class object 141. The class data D are stored in a shared class data table 147, and a class management object 145 for managing the class data D is generated.

The class name D of the class data D managed by the class management object 145 is registered in the class name list (class names) of the class management object 145, and a deletion flag (removable flag) is set FALSE. The local class data table (local classes), the replacement class data storage area (next classes), and the referenced object list (referred) are null.

The 'function-4' is registered as the name of the class management object 145 in a class management object table 142. Corresponding to the name 'function-4' of the class management object 145, a pointer to the class management object 145 is generated in the class management object table 142.

Assume that the class data D is based on, for example, the existence of the class data A and B as follows.

```
class D ( ) {
    .
    .
    .
    new A ( );
    .
    .
    .
    new B ( );
}
```

The reference object list (referring) of the class management object 145 stores the reference information about the class management object 143 for managing the referenced class data A and B, and the referenced object list (referred) of the class management object 143 stores the referenced information about the class management object 145 which manages the referencing class data D.

In this state, when a request to process the class data D is issued to the agent class object 141 by specifying the name 'function-4', the object D is generated from the class data D, and a thread 144 is assigned.

The running thread ID list (running threads) of the class management object 145 stores the identification information of the thread 144 assigned to the object D, and the running thread ID list (running threads) of the class management object 143 for managing class data A and B referred to by the class D also stores the identification information of the thread 144 assigned to the object D.

When the execution of the object D is completed, the identification information about the thread 144 assigned to the object D is deleted from the running thread ID list (running threads) of the class management object 143 and the class management object 145.

Therefore, even if a request to delete or add the function named 'function-1' is issued to the agent class object 141 during the execution of the function named 'function-4', the class management object 143 can hold the request to delete or add the function named 'function-1' by checking its own running thread ID list (running threads), thereby preventing the execution of the function named 'function-4' from being rejected during the execution of the function named 'function-4'

FIG. 19 is a flowchart showing the process performed on class data.

When the agent class objects 22a through 22n performs a process on the class data, the call ( ) method 26f is invoked.

In FIG. 19, access privileges are checked first on the agent class objects 22a through 22n (step S61). If no access privileges exist, the process terminates.

Next, the names 'function-1' through 'function-m' of the class management objects 24a through 24m for managing the class data to be processed are obtained from the argument of the call ( ) method 26f (step S62), and the names 'function-1' through 'function-m' of the class management objects 24a through 24m for managing the class data to be processed are retrieved from the class management object table 23 (step S63).

Then, it is checked whether or not the names 'function-1' through 'function-m' of the class management objects 24a through 24m for managing the class data to be processed are registered in the class management object table 23 (step S64). If the names 'function-1' through 'function-m' of the class management objects 24a through 24m for managing the class data to be processed are not registered in the class management object table 23, an error notification is issued and the process is suspended (step S65).

If the names 'function-1' through 'function-m' of the class management objects 24a through 24m for managing the class data to be processed are registered in the class management object table 23, then the running thread ID is added to the running thread ID list 44 of the class management objects 24a through 24m, and the running thread ID is added to the running thread ID list 44 of the class management objects 24a through 24m shown in the reference object list 46 of the class management objects 24a through 24m (step S66).

Then, an object is generated from the class data to be processed (step S67), and the end of the process is awaited (step S68).

When the process terminates, the running thread ID is deleted from the running thread ID list 44 of the class management objects 24a through 24m, and the running thread ID is deleted from the running thread ID list 44 of the class management objects 24a through 24m shown in the reference object list 46 of the class management objects 24a through 24m (step S69).

It is checked whether or not the running thread ID list 44 is empty (step S70). If the running thread ID list 44 is not empty, the execution process terminates (step S71). When the running thread ID list 44 is empty, it is checked whether or not the deletion flag 42 is TRUE (step S72). If the deletion flag 42 is TRUE, then the deleting process is reserved, and the deleting process shown in FIG. 21 is invoked (step S73) and the execution process terminates (step S74).

If the deletion flag 42 is FALSE, it is checked whether or not the replacement class data storage area 43 is empty (step S75). If the replacement class data storage area 43 is empty, the execution process terminates (step S76). If the replacement class data storage area 43 is not empty, the replacing process is reserved, and the replacing process shown in FIGS. 24 and 25 are invoked using as an argument the class data stored in the replacement class data storage area 43 (step S77), thereby terminating the execution process.

When the operating agent class objects 22a through 22n accept a request to delete or replace class data, the class management objects 24a through 24m monitor the utilization of each class data. As a result, the deletion or replacement of the class data can be delayed until the class data to be deleted or replaced become unavailable, thereby successfully processing the class data deletion or replacement request without stopping the operating agent class objects 22a through 22n.

When a class data deletion or replacement request is issued to the operating agent class objects 22a through 22n, a stop request can be issued to an object which is using the class data to be deleted or replaced so that the class data can be deleted after the response from the object.

Described below is the method of deleting class data from the agent class objects 22a through 22n.

Figure 20:
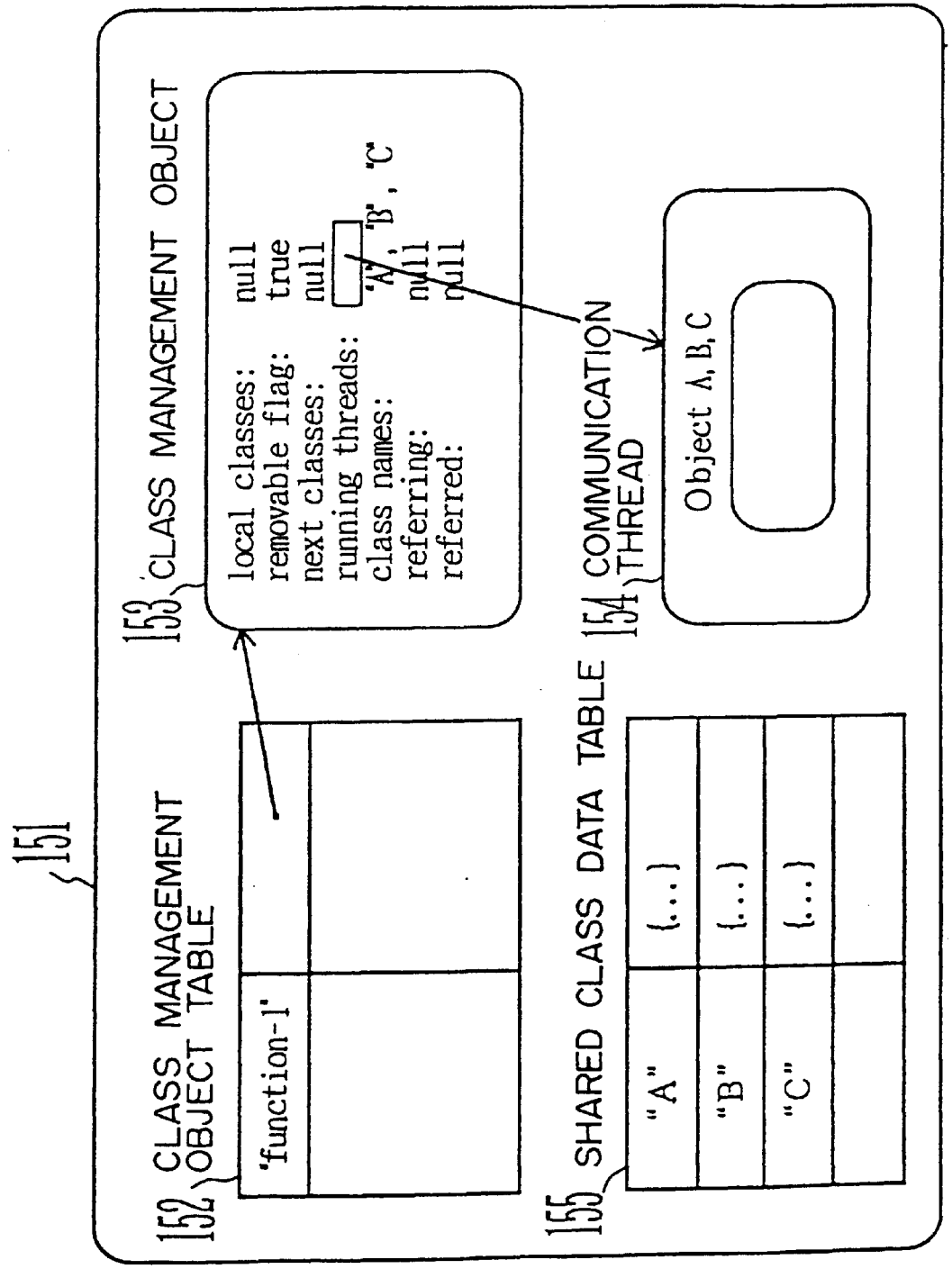
FIG. 20 shows the state of an agent class object when a deletion request is issued while class data is processed.

FIG. 20 shows the state of an agent class object when a deletion request is issued when the class data is processed.

In FIG. 20, for example, the function comprising the class data A, B, and C is added as the name 'function-1' to an agent class object 151. The class data A, B, and C are stored in a shared class data table 155, and a class management object 153 for managing the class data A, B, and C is generated.

The class names A, B, and C of the respective class data A, B, and C managed by the class management object 153 are registered in the class name list (class names) of the class management object 153. The local class data table (local classes), the replacement class data storage area (next classes), the reference object list (referring), and referenced object list (referred) are null. The 'function-1' is registered as the name of the class management object 153 in a class management object table 152. Corresponding to the name 'function-1' of the class management object 153, a pointer to the class management object 153 is generated in the class management object table 152.

Furthermore, when the function named 'function-1' is performed, the objects A, B, and C are generated from the class data A, B, and C, and are assigned a thread 154. Simultaneously, the running thread ID list (running threads) stores identification information about the thread 154 assigned to the objects A, B, and C.

In this state, when the name 'function-1' is specified and a deletion request for the class data A, B, and C is issued, the class management object 153 refers to a running thread ID list (running threads), and confirms the utilization of the class data A, B, and C.

In this case, since a running thread ID list (running threads) contains the identification information about the thread 154, it is recognized that the class data A, B, and C are being used, a deletion request for the class data A, B, and C are held, a deletion flag (removable flag) is set TRUE, and the deletion request for the class data A, B, and C is stored.

When the function named 'function-1' is completely performed, the identification information about the thread 154 is deleted from the running thread ID list (running threads), and the class management object 153 confirms whether or not a deletion request for the class data A, B, and C has been issued by referring to the state of the deletion flag (removable flag).

Since the deletion flag (removable flag) is TRUE, the class data A, B, and C are successfully deleted at this time.

When a strong deletion request is issued, the function named 'function-1' being performed is suspended to immediately delete the class data A, B, and C.

FIG. 21 is a flowchart showing a class data deleting process.

When the agent class objects 22a through 22n delete class data, the remove ( ) method 26a is invoked.

In FIG. 21, access privileges are checked first on the agent class objects 22a through 22n (step S81). If no access privileges exist, the process terminates.

Next, the names 'function-1' through 'function-m' of the class management objects 24a through 24m for managing the class data to be deleted are obtained from the argument of the remove ( ) method 26a (step S82), and the names 'function-1' through 'function-m' of the class management objects 24a through 24m for managing the class data to be deleted are retrieved from the class management object table 23 (step S83).

Then, it is checked whether or not the names 'function-1' through 'function-m' of the class management objects 24a through 24m for managing the class data to be deleted are registered in the class management object table 23 (step S84). If the names 'function-1' through 'function-m' of the class management objects 24a through 24m for managing the class data to be deleted are not registered in the class management object table 23, an error notification is issued and the process is suspended (step S85).

If the names 'function-1' through 'function-m' of the class management objects 24a through 24m for managing the class data to be deleted are registered in the class management object table 23, it is checked whether or not the running thread ID list 44 is empty (step S86). If the running thread ID list 44 is not empty, the deletion flag 42 of the class management objects 24a through 24m is set TRUE (step S87), thereby terminating the deleting process (step S88).

If the running thread ID list 44 is empty, it is checked whether or not the referenced object list 47 is also empty (step S89). If the referenced object list 47 is not empty, an error notification is issued and a deleting process is suspended (step S90).

If the referenced object list 47 is empty, it is checked whether or not the reference object list 46 is also empty (step S91). If the reference object list 46 is not empty, then the referenced information about the class management objects 24a through 24m are deleted from the referenced object list 47 of each of the class management objects 24a through 24m shown in the reference object list 46 (step S92).

On the other hand, if the reference object list 46 is empty, the class management objects 24a through 24m specify the class data to be deleted from the shared class data table 25 by referring to the class name list 45, and delete the class data having the class name registered in the class name list 45 of the class management objects 24a through 24m from the shared class data table (step S93).

Then, the names 'function-1' through 'function-m' of the class management objects 24a through 24m are deleted from the class management object table 23, and the deleting process terminates.

Described below is the method of replacing the class data of the agent class objects 22a through 22n.

Figure 22:
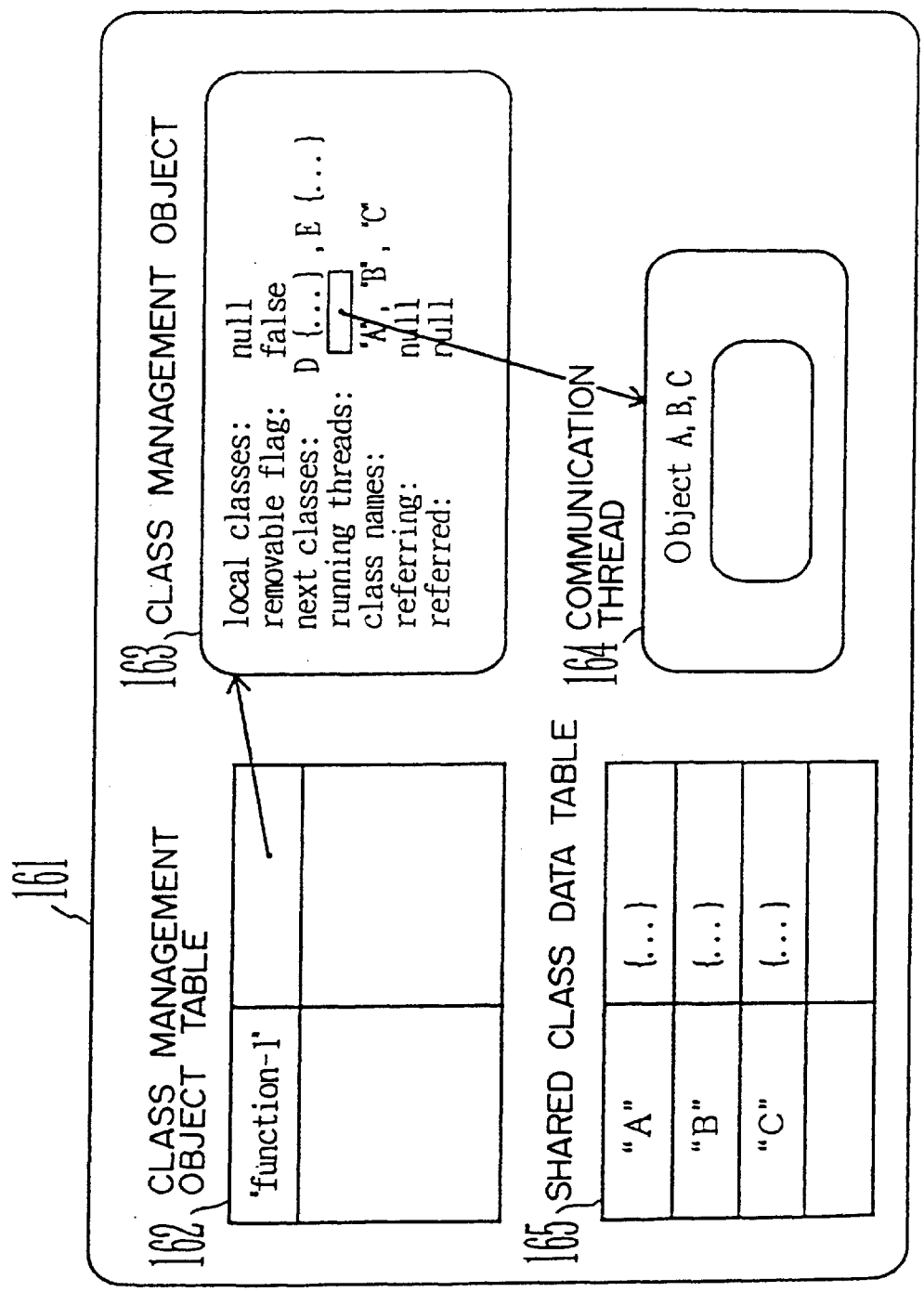
FIG. 22 shows the state of an agent class object when a replacement request is issued while class data is processed.

FIG. 22 shows the state of the agent class object when a replacement request is issued when the class data is processed. In this example, the function named 'function-1' comprising the class data A, B, and C is replaced with the function named 'function-2' comprising the class data D and E.

In FIG. 22, for example, the function comprising the class data A, B, and C is added as the name 'function-1' to an agent class object 161. The class data A, B, and C are stored in a shared class data table 165, and a class management object 163 for managing the class data A, B, and C is generated.

The class names A, B, and C of the respective class data A, B, and C managed by the class management object 163 are registered in the class name list (class names) of the class management object 163, and a deletion flag (removable flag) is set FALSE. The local class data table (local classes), the reference object list (referring), and the referenced object list (referred) are null.

The 'function-1' is registered as the name of the class management object 163 in a class management object table 162. Corresponding to the name 'function-1' of the class management object 163, a pointer to the class management object 163 is generated in the class management object table 162.

Furthermore, when the function named 'function-1' is performed, the objects A, B, and C are generated from the class data A, B, and C, and are assigned a thread 164. Simultaneously, the running thread ID list (running threads) stores identification information about the thread 164 assigned to the objects A, B, and C.

In this state, when the name 'function-1' is specified and a replacement request for the class data A, B, and C is issued, the class management object 163 refers to a running thread ID list (running threads), and confirms the utilization of the class data A, B, and C.

In this case, since a running thread ID list (running threads) contains the identification information about the thread 164, it is recognized that the class data A, B, and C are being used, a replacement request for the class data A, B, and C are held, and the class data D and E to replace the class data A, B, and C are stored in the replacement class data storage area (next classes).

When the function named 'function-1' is completely performed, the identification information about the thread 164 is deleted from the running thread ID list (running threads), and the class management object 163 confirms whether or not a replacement request for the class data A, B, and C has been issued by referring to the state of the replacement class data storage area (next classes).

In this example, since the replacement class data storage area (next classes) stores the class data D and E, the class data A, B, and C are successfully replaced with the class data D and E.

When a strong replacement request is issued, the function named 'function-1' being performed is suspended to immediately replace the class data A, B, and C.

Figure 23:
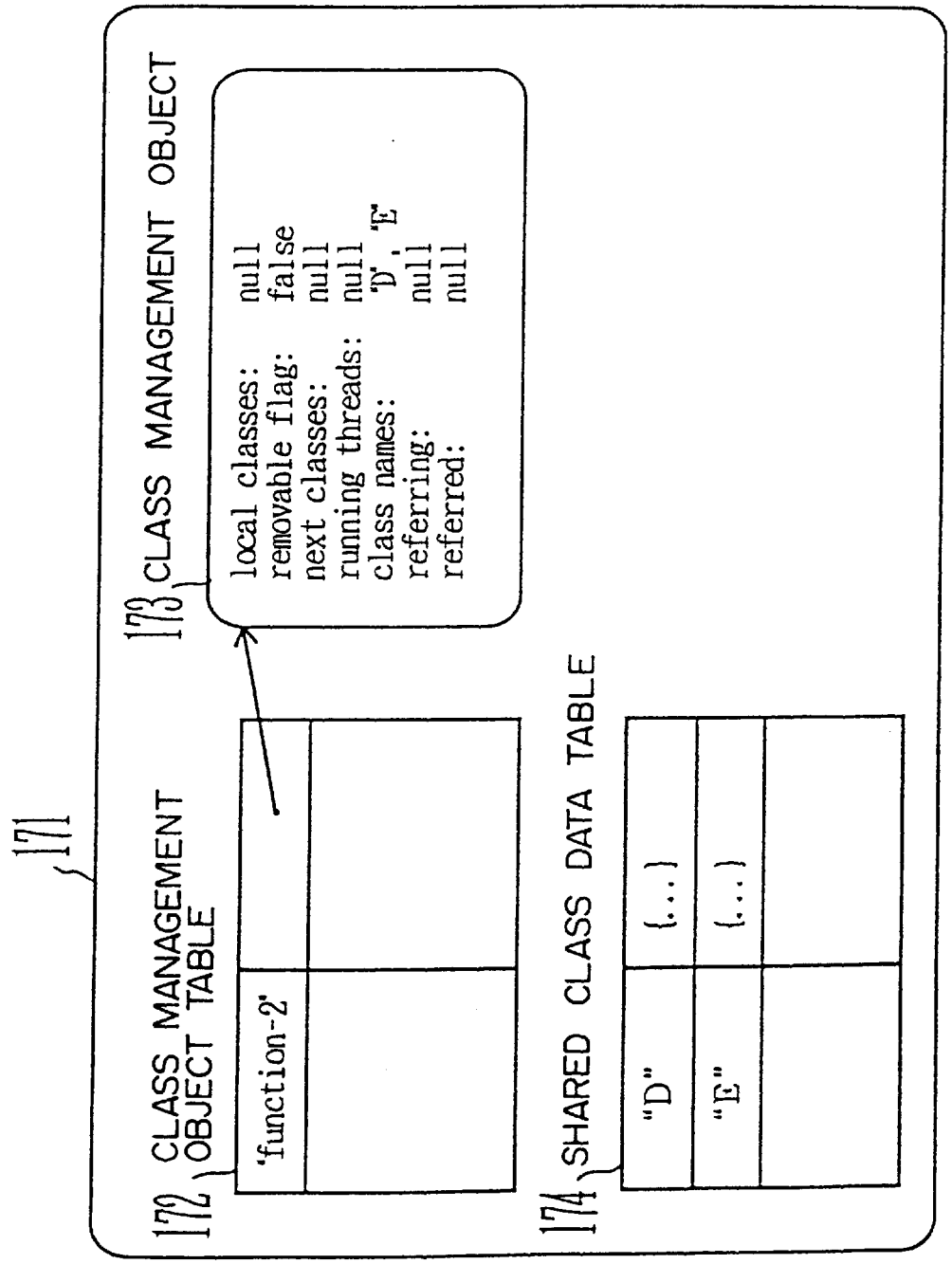
FIG. 23 shows the state of an agent class object after replacing class data.

FIG. 23 shows the state of the agent class object after the replacement the class data.

In FIG. 23, when the class data A, B, and C are replaced with the class-data D and E, the class data D and E are deleted from the replacement class data storage area (next classes) of the class management object 163 shown in FIG. 22, and the class names A, B, and C of the class data A, B, and C registered in the class name list (class names) shown in FIG. 22 are replaced with the class names D and E of the class data D and E. Thus, the class management object 163 shown in FIG. 22 is updated to a class management object 173.

The class data A, B, and C stored in the shared class data table 165 shown in FIG. 22 are replaced with the class data D and E, and the shared class data table 165 shown in FIG. 22 is updated to a shared class data table 174 shown in FIG. 23.

Furthermore, the name 'function-1' of the class data A, B, and C registered in the class management object table 162 shown in FIG. 22 is replaced with the name 'function-2' of the class data D and E, and the class management object table 162 shown in FIG. 22 is updated to a class management object table 172 shown in FIG. 23.

FIGS. 24 and 25 are flowcharts showing the class data replacing process.

When the agent class objects 22a through 22n perform the class data deleting process, the set ( ) method 26d is invoked.

In FIG. 24, access privileges are checked first on the agent class objects 22a through 22n (step S101). If no access privileges exist, the process terminates.

Next, the names 'function-1' through 'function-m' of the class management objects 24a through 24m for managing the class data to be replaced and new replacing class data are obtained from the argument of the set ( ) method 26d (step S102), and the names 'function-1' through 'function-m' of the class management objects 24a through 24m for managing the class data to be replaced are retrieved from the class management object table 23 (step S103).

Then, it is checked whether or not the names 'function-1' through 'function-m' of the class management objects 24a through 24m for managing the class data to be replaced are registered in the class management object table 23 (step S104). If the names 'function-1' through 'function-m' of the class management objects 24a through 24m for managing the class data to be replaced. are not registered in the class management object table 23, an error notification is issued and the process is suspended (step S105).

If the names 'function-1' through 'function-m' of the class management objects 24a through 24m for managing the class data to be replaced are registered in the class management object table 23, it is checked whether or not the running thread ID list 44 is empty (step S106). If the running thread ID list 44 is not empty, the class data obtained from the argument of the set ( ) method 26d is set in the replacement class data storage area 43 (step S107), thereby terminating the replacing process (step S108).

If the running thread ID list 44 is empty, it is checked whether or not the referenced object list 47 is also empty (step S109). If the referenced object list 47 is not empty, an error notification is issued and a deleting process is suspended (step S110).

If the referenced object list 47 is empty, it is checked whether or not the reference object list 46 is also empty (step S111). If the reference object list 46 is not empty, then the referenced information about the class management objects 24a through 24m are deleted from the referenced object list 47 of each of the class management objects 24a through 24m shown in the reference object list 46 (step S112).

On the other hand, if the reference object list 46 is empty, the class management objects 24a through 24m specify the class data to be deleted from the shared class data table 25 by referring to the class name list 45, and delete the class data having the class name registered in the class name list 45 of the class management objects 24a through 24m from the shared class data table (step S113).

As shown in FIG. 25, new class data specified by a replacement request is written to the shared class data table 25 (step S114).

Then, it is determined whether or not the same class name exists in the shared class data table 25 (step S115). If the same class name exists in the shared class data table 25 while the class data is being written, the class data newly stored in the shared class data table 25 is deleted, and the shared class data table 25 is restored to its original state (step S116), an error notification is issued, and the process terminates (step S117).

If the same class name does not exist in the shared class data table 25, then the class names of all class data newly added to the shared class data table 25 are set in the class name list 45 of the class management objects 24a through 24m (step S118).

Then, by checking the class related to the class data added to the shared class data table 25, destination information is set in the reference object list 46 of the class management objects 24a through 24m (step S119), and source information is set in the referenced object list 47 of the class management objects 24a through 24m (step S120), thereby terminating the process.

Described below is the method of remotely processing class data in the agent class objects 22a through 22n.

Figure 26:
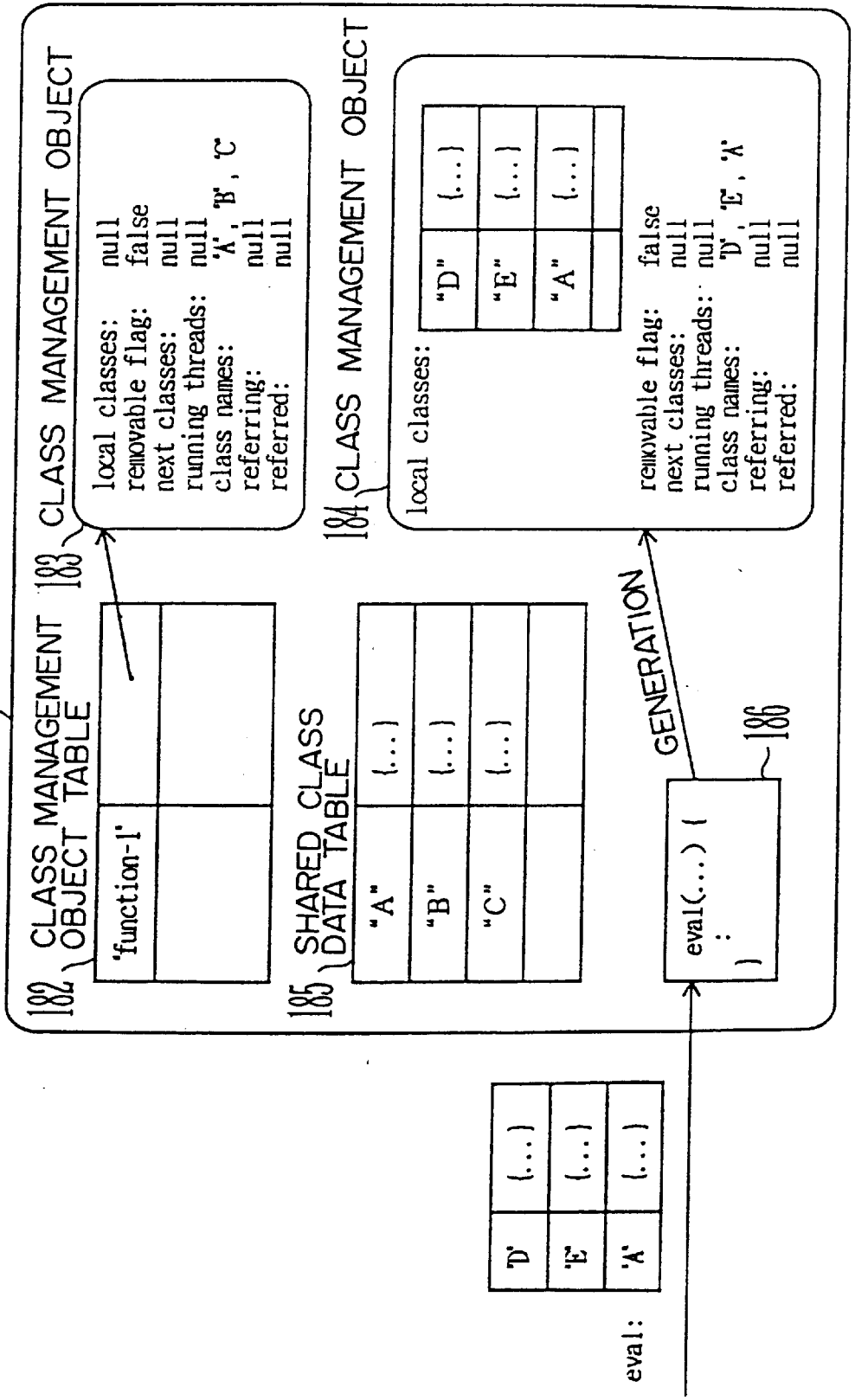
FIG. 26 shows the state of an agent class object. when class data is remotely evaluated.

FIG. 26 shows the state of the agent class object while the class data is remotely evaluated.

In FIG. 26, for example, the function comprising the class data A, B, and C is added as the name 'function-1' to an agent class object 181. The class data A, B, and C are stored in a shared class data table 185, and a class management object 183 for managing the class data A, B, and C is generated.

The class names A, B, and C of the respective class data A, B, and C managed by the class management object 183 are registered in the class name list (class names) of the class management object 183, and a deletion flag (removable flag) is set FALSE. The local class data table (local classes), the replacement class data storage area (next classes), the running thread ID list (running threads), the reference object list (referring), and the referenced object list (referred) are null.

The 'function-1' is registered as the name of the class management object 183 in a class management object table 182, and a pointer to a class management object 183 is generated in the class management object 183 corresponding to the name function-1 of the class management object table 182.

When an eval ( ) method 186 is invoked for the agent class object 181 using as arguments the class data D, E, and A, a class management object 184 is newly generated. The class data D, E, and A are stored in the local class table (local classes) of the class management object 184. The class name list (class names) of the class management object 184 stores the class names D, E, and A of the class data D, E, and A respectively.

The deletion flag (removable flag) of the class management object 184 is set FALSE, and the replacement class data storage area (next classes), the running thread ID list (running threads), the reference object list (referring), and the referenced object list (referred) are null.

Thus, if the function comprising the class data D, E, and A is added to the agent class object 181, the class data D, E, and A are stored in the local class data table (local classes) of the class management object 184. Therefore, even if the class data A is registered in the shared class data table 185, the conflict of the same class name A can be avoided in the shared class data table 185, and the function comprising the class data D, E, and A can be performed.

The method of storing the class data D, E, and A in the local class data table (local classes) of the class management object 184 is effective when the frequency of the use of the function comprising the class data D, E, and A is low or when the class data to be processed can be frequently amended.

Figure 27:
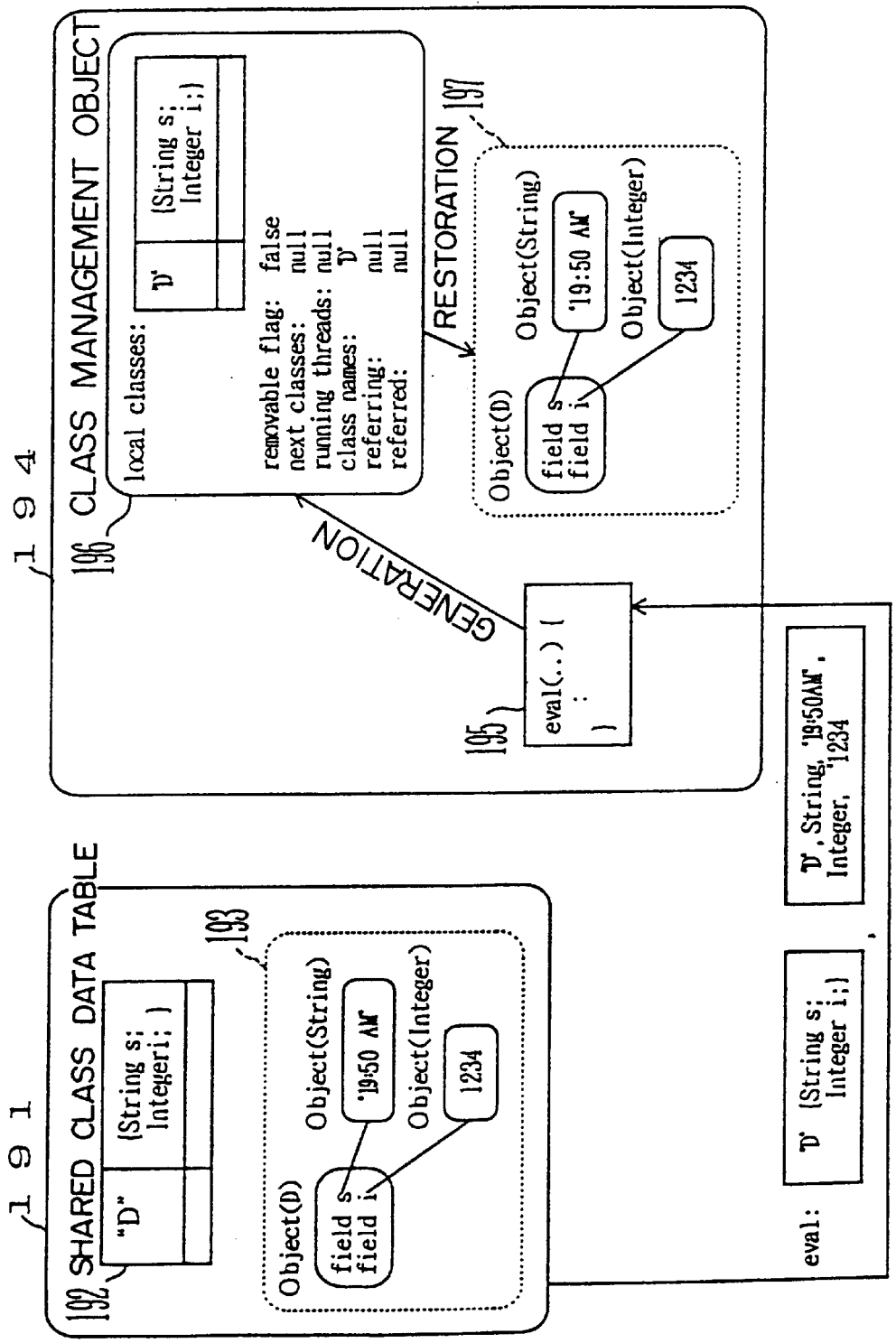
FIG. 27 shows the state of an agent class object when serialized data is remotely evaluated.

FIG. 27 shows the state of the agent class object when serialized data is remotely evaluated.

In FIG. 27, the class data D is stored in a shared class data table 192 of an agent class object 191, and is defined as having an object of a class String and an object of a class Integer as attributes. An instance 193 of the class data D is generated in the agent class object 191.

When the agent class object 191 invokes an eval ( ) method 195 of an agent class object 194 using as arguments the class data D and the instance 193 of the class data D, the agent class object 191 serializes the instance 193 of the class data D.

Then, the class data D and the serialized data of the instance 193 are set as arguments of the eval ( ) method 195, and transmits 'D' {Strings;Integer i;}, 'D', String, '19:50AM', Integer, '19:50AM'.

When the eval ( ) method 195 is invoked, the agent class object 194 generates a class management object 196, and stores the contents {Strings; Ingeger i; of the class data D in the local class data table (local classes) of the class management object 196, and stores the class name D of the class data D in the class name list (class names) of the class management object 196.

The deletion flag (removable flag) of the class management object 196 is set FALSE, and the replacement class data storage area (next classes), the running thread ID list (running threads), the reference object list (referring), and the referenced object list (referred) are null.

Furthermore, based on the class data D and the serialized data of the instance 193, an instance 197 obtained by restoring the instance 193 of the agent class object 191 is generated, and the class data D and the instance 197 are processed.

Thus, when the agent class object 194 receives from another agent class object 191, the class data and the serialized data of an object generated from the class data, the agent class object 194 does not generate a new object from the received class data, but the source object is restored from the received class data and the serialized data, thereby in a remote executing process, the instance 193 of the other agent class object 191 can be processed.

FIG. 28 is a flowchart showing a remote evaluation process.

When the agent class objects 22*a* through 22*n* perform the class data remote process, the eval ( ) method 26*e* is invoked.

In FIG. 28, access privileges are checked first on the agent class objects 22*a* through 22*n* (step S130). If no access privileges exist, the process terminates.

Next, the class data and the serialized object data are obtained from the argument of the eval ( ) method 26*e* (step S131) to newly generate the class management objects 24*a* through 24*m* for managing the class data, and to set the class data of the argument in the local class data table 41 of the class management objects 24*a* through 24*m* (step S132).

Then, by checking the class related to the class data added to the local class data table 41, the destination information is set in the reference object list 46 of the class management objects 24*a* through 24*m* (step S133), and the source information is set in the referenced object list 47 of the referenced class management objects 24*a* through 24*m* (step S134).

A running thread ID is added to the running thread ID list 44 of the class management objects 24*a* through 24*m*, and the running thread ID is added to the running thread ID list 44 of the class management objects 24*a* through 24*m* shown in the reference object list 46 of the class management objects 24*a* through 24*m* (step S135).

Then, it is checked whether or not serialized object data exists in the argument of the eval ( ) method 26*e* (step S136). If no serialized object data exists in the argument of the eval ( ) method 26*e*, then an object is generated from the class data to be processed and the object is processed (step S137), and the end of the process on the object is awaited (step S139).

If serialized object data exists in the argument of the eval ( ) method 26*e*, then the object is restored using the serialized object data and the class data in the local class data table 41, and the object is processed (step S138).

When the process is completed, then the running thread ID is deleted from the running thread ID list 44 of the class management objects 24*a* through 24*m*, and the running thread ID is deleted from the running thread ID list 44 of the class management objects 24*a* through 24*m* shown in the reference object list 46 of the class management objects 24*a* through 24*m* (step S140).

Then, the referenced information about the class management objects 24*a* through 24*m* is deleted from the referenced object list 47 of each of the class management objects 24*a* through 24*m* shown in the reference object list 46 (step S141), and the class management objects 24*a* through 24*m* for managing the class data to be processed are deleted (step S142).

Figure 29:
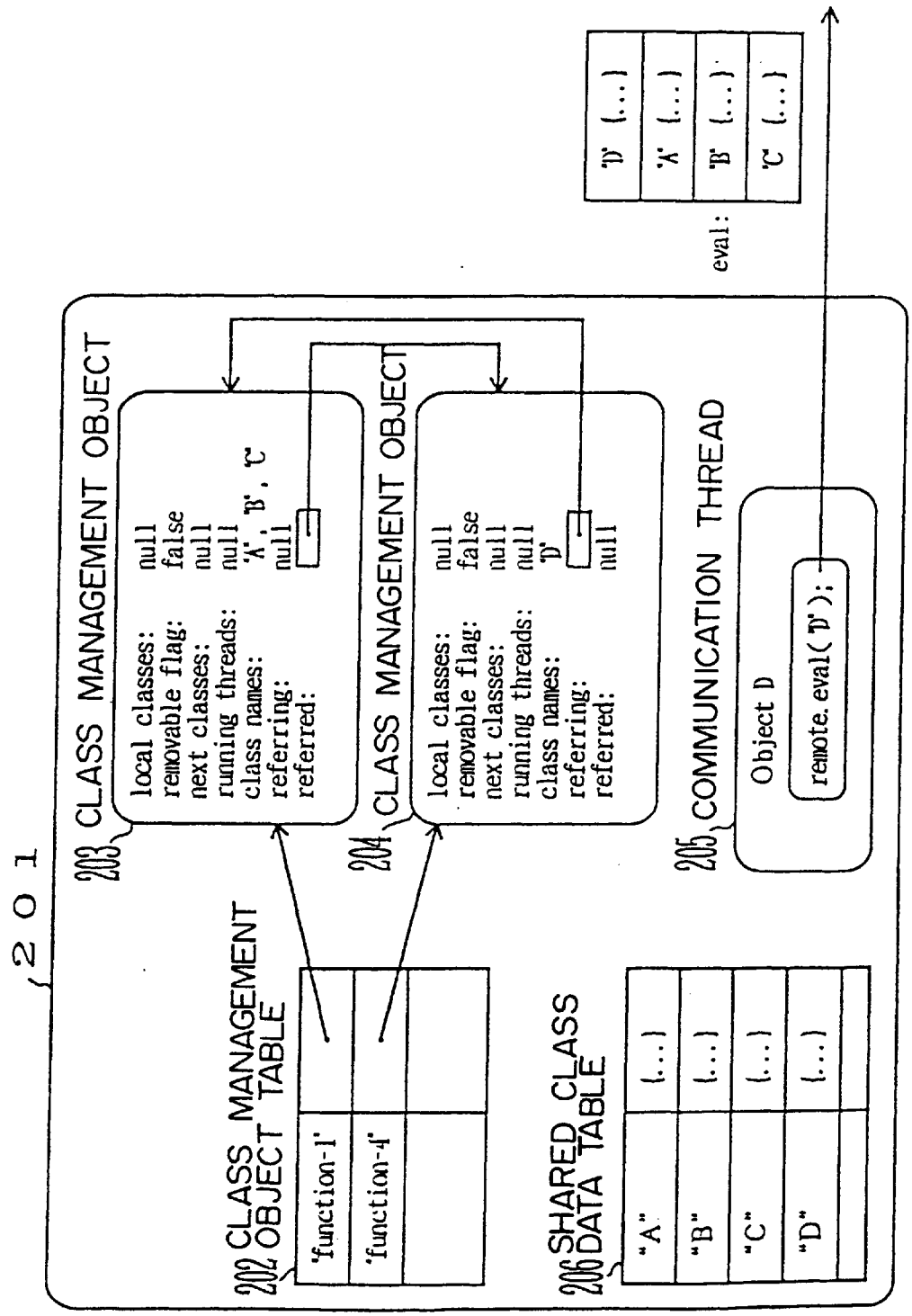
FIG. 29 shows the state of an agent class object when referenced class data is remotely evaluated.

FIG. 29 shows the state of the agent class object when class data having reference relationship is remotely processed.

In FIG. 29, for example, the function comprising the class data A, B, and C is added as the name 'function-1' to an agent class object 201. The class data A, B, and C are stored in a shared class data table 206, and a class management object 203 for managing the class data A, B, and C is generated.

The class names A, B, and C of the respective class data A, B, and C managed by the class management object 203 are registered in the class name list (class names) of the class management object 203. The deletion flag (removable flag) is set FALSE, and the local class data table (local classes), the replacement class data storage area (next classes), the running thread ID list (running threads), and the reference object list (referring) are null.

The 'function-1' is registered as the name of the class management object 203 in a class management object table 202. Corresponding to the name 'function-1' of the class management object 203, a pointer to the class management object 203 is generated in the class management object table 202.

Furthermore, a function which is named 'function-4' and comprises the class data D is added to the agent class object 201. The class data D is stored in the shared class data table 206, and a class management object 204 for managing the class data D is generated.

The class name D of the class data D managed by the class management object 204 are registered in the class name list (class names) of the class management object 204. The deletion flag (removable flag) is set FALSE, and the local class data table (local classes), the replacement class data storage area (next classes), the running thread ID list (running threads), and the referenced object list (referred) are null.

The 'function-4' is registered as the name of the class management object 204 in a class management object table 202. Corresponding to the name 'function-4' of the class management object 204, a pointer to the class management object 204 is generated in the class management object table 202.

Assume that the class data D is based on, for example, the existence of the class data A and B as follows.

class D ( ) {

.

.

.

new A ( );

.

.

.

new B ( );
}

The reference object list (referring) of the class management object 204 stores the reference information about the class management object 203 for managing the referenced class data A and B, and the referenced object list (referred) of the class management object 203 stores the referenced information about the class management object 204 which manages the referencing class data D.

The relation in invoking a class can be checked using, for example, in the Java language, getDeclaredClasses ( ) which is a class method.

In this state, when the agent class object 201 issues a request to remotely process the class data D with the name 'function-4 specified, a thread 205 is generated, the class data D is transmitted together with the class data A, B, and C managed by the class management object 203 shown in the reference object list (referring) of the class management object 204.

The class data A, B, and C managed by the class management object 203 and the class data D managed by the class management object 204 are stored in the shared class data table 206 of the agent class object 201 and managed by the same agent class object 201. Therefore, the class data A and B referenced by the class data d can be easily obtained.

Thus, the relation in invoking a class to be remotely processed and another class required when the class is processed is checked before the transfer of the class data. When the class data to be remotely processed is transmitted, another class data required in processing the class data is transmitted together. As a result, the load of the process can be reduced at the destination especially when class data are stored as distributed, for example, in a distributed system, etc.

Figure 30:
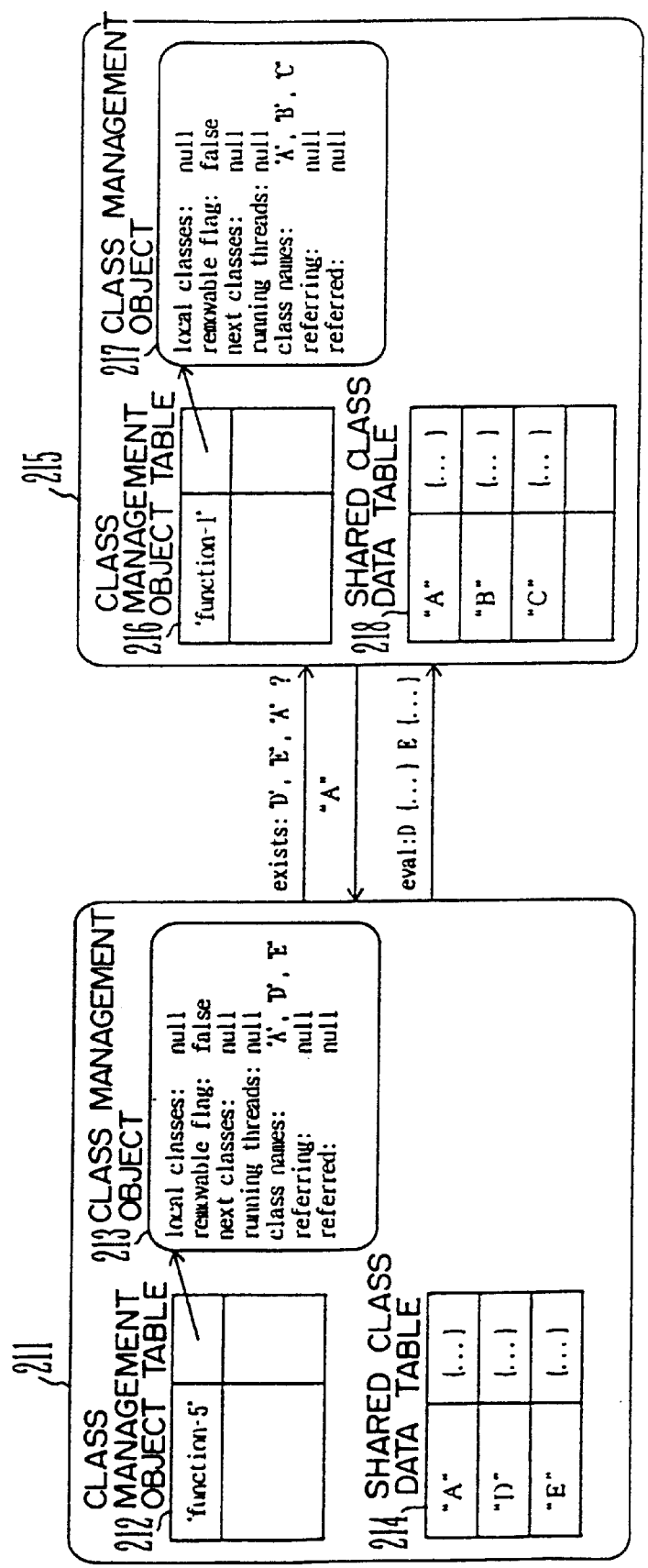
FIG. 30 shows the state of an agent class object when overlapping class data is remotely evaluated.

FIG. 30 shows the state of the agent class object when overlapping class data are remotely evaluated.

In FIG. 30, for example, a function which is named 'function-5' and comprises the class data A, D, and E is added to the agent class object 211. The class data A, D, and E are stored in the shared class data table 214, and a class management object 213 for managing the class data A, D, and E is generated.

The class names A, D, and E of the respective class data A, D, and E managed by the class management object 213 are registered in the class name list (class names) of the class management object 213. The deletion flag (removable flag) is set FALSE, and the local class data table (local classes), the replacement class data storage area (next classes), the running thread ID list (running threads), the reference object list (referring), and the referenced object list (referred) are null.

The 'function-5' is registered as the name of the class management object 213 in a class management object table 212. Corresponding to the name 'function-5' of the class management object 213, a pointer to the class management object 213 is generated in the class management object table 212.

Furthermore, a function which is named 'function-1' and comprises the class data A, B, and C is added to the agent class object 215. The class data A, B, and C are stored in the shared class data table 218, and a class management object 217 for managing the class data A, B, and C is generated.

The class names A, B, and C of the respective class data A, B, and C managed by the class management object 217 are registered in the class name list (class names) of the class management object 217. The deletion flag (removable flag) is set FALSE, and the local class data table (local classes), the replacement class data storage area (next classes), the running thread ID list (running threads), the reference object list (referring), and the referenced object list (referred) are null.

The name 'function-1' is registered as the name of the class management object 217 in a class management object table 216. The pointer to the class management object 217 is generated in the class management object table 216 corresponding to the name 'function-1' of the class management object 217.

When the agent class object 211 remotely executes the function named 'function-5' through an agent class object 215, it is inquired whether or not the class data D, E, and A forming the function named 'function-5' exist in the shared class data table 218 of the agent class object 215.

The agent class object 215 checks whether or not the class data D, E, and A exist in the shared class data table 218. Among the class data D, E, and A, it is recognized that the class data A exists in the shared class data table 218. Then, the information about the existence of the class data A is returned to the agent class object 211.

When the agent class object 211 is notified of the existence of the class data A, it transfers only the class data D and E to the agent class object 215, from the class data D, E, and A to be transferred to the agent class object 215.

The agent class object 215 uses the class data D and E transferred from the agent class object 211, and also uses the class data A stored in the shared class data table 218, thereby performing the function named 'function-5'.

Thus, it is not necessary to transmit the class data stored in the transferred-to shared class data table when a remote evaluation is performed, and the amount of transfer of the class data can be reduced.

Described below is the method of retrieving class data by the agent class objects 22a through 22n.

The class management objects 24a through 24m have the class search function 48, and invoke the loadClass ( ) method of the class management objects 24a through 24m when an object is generated from the class data added to the agent class objects 22a through 22n, or when an object is generated from the class data declared in the method of the object.

Figure 31:
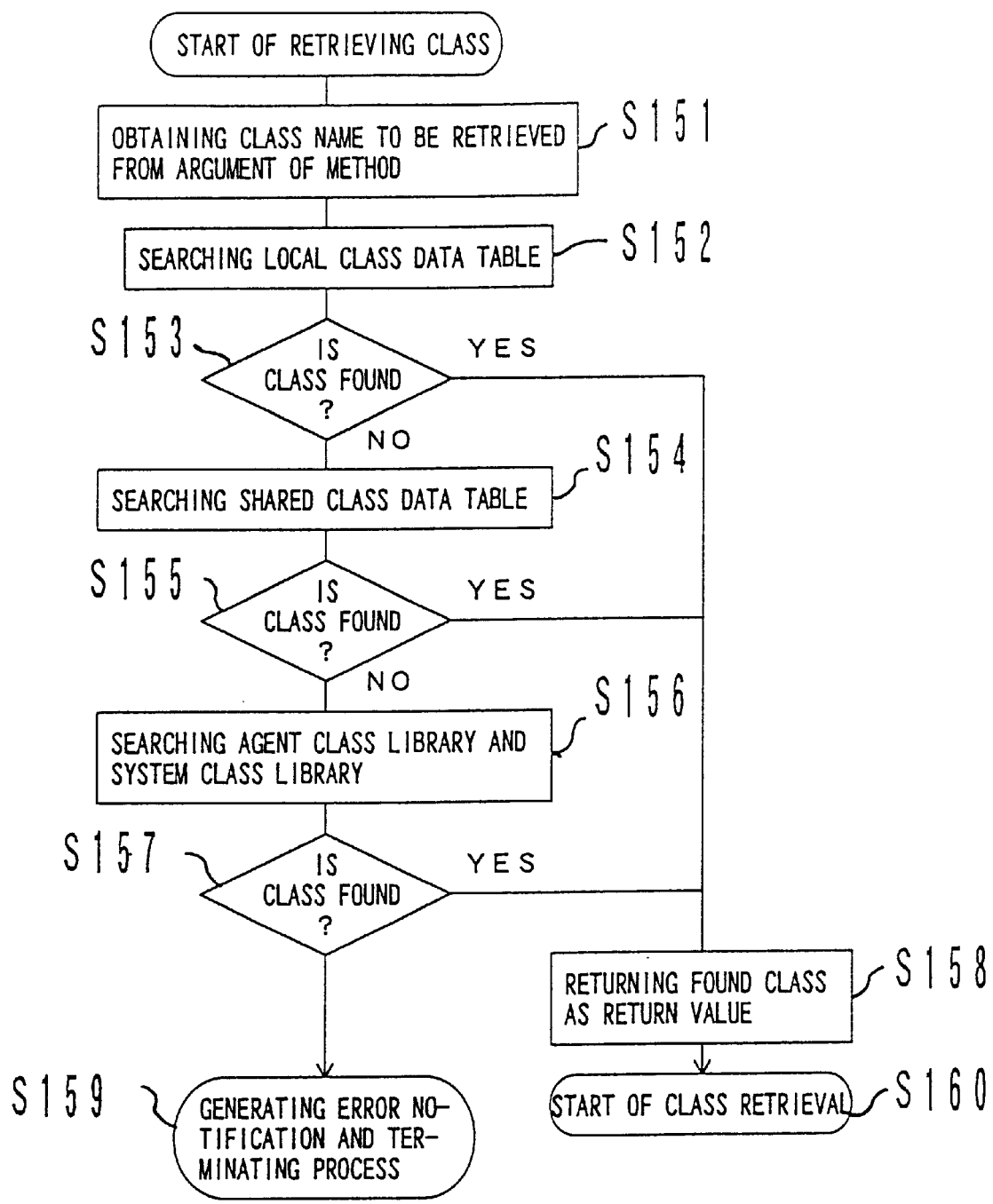
FIG. 31 is a flowchart showing a class retrieving process.

FIG. 31 is a flowchart showing the class retrieving process.

In FIG. 31, the class name of the class data to be retrieved is fetched from the arguments of the loadClass ( ) method (step S151), and the local class data table 41 is searched (step S152). Then, the result of searching the local class data table 41 is checked (step S153). When the class data to be retrieved is found, the class data is returned as a return value (step S158).

If the class data to be retrieved is not found in the local class data table 41, the shared class data table 25 is searched (step S154). Then, the result of searching the shared class data table 25 is checked (step S155). When the class data to be retrieved is found, the class data is returned as a return value (step S158).

If the class data to be retrieved is not found in the shared class data table 25, the agent class library 31 and the system class library 32 are searched (step S156). Then, the result of searching the agent class library 31 and the system class library 32 is checked (step S157). If the class data to be retrieved is found, the class data is returned as a return value (step S158).

If the class data to be retrieved is not found in the agent class library 31 or the system class library 32, then an error notification is issued and the process terminates (step S159).

As described above, according to the present invention, an agent class is provided with distributed objects having the functions of replacing and remotely processing class data. Therefore, a flexible distributed object system can be easily operated, and a developer can utilize these function easily and securely without knowledge of class management.

The present invention is described above, but is not limited to the above described embodiments, and can be varied within the technological concept of the present invention.

According to the present invention as described above, a program can be monitored for each piece of class data having added utilization data of the program. As a result, the class data being used can be recognized while the program is operated, and a part of the program code can be deleted or replaced during the execution of the program.

According to an aspect of the present invention, even if a process request for deletion, replacement, etc. is issued to a program being executed, the program can be deleted or replaced without stopping the operation of the program, thereby reducing the load of the programmer when customizing the program.

According to a further aspect of the present invention, a monitor object for monitoring the utilization of class data is provided in an object to be monitored. The function of monitoring a program can be easily added to the program to be monitored, the utilization of the program can be easily monitored without programmer's knowledge about class management, and a part of a program code can be deleted or replaced while the program is running.

According to a further aspect of the present invention, a monitor object is generated each time an addition request for class data is issued. A program can be monitored for each function newly added to the program, and when the program is running, it can be determined which function of the program is being used. Therefore, only specifying the function of a part of the program can delete or replace the function of the program while the program is running.

According to a further aspect of the present invention, identification information about a class management object is stored. Only specifying identification information such as a name of a class management object, etc. deletes or replaces a part of a program code while the program is running, thereby reducing the load of the programmer when customizing the program.

According to a further aspect of the present invention, a class management object includes a local class data table for storing class data specific to the class management object. Thus, even when there is a conflict between the class data transmitted from another object and the class data being managed by a class management object, the class data transmitted from another object and the class data being managed by a class management object can be independently stored, and an agent class object can remotely evaluate the class data transmitted from another object.

According to a further aspect of the present invention, a class data deletion request can be stored and accepted while the class data specified by the data deletion request is being used. As a result, it is not necessary to reissue a class data deletion request after the request is once rejected. Therefore, when the class data is deleted, the load of the programmer can be reduced.

According to a further aspect of the present invention, new class data can be stored when a replacement request is issued, and a class data replacement request can be accepted while the class data specified by the class data replacement request is being used. As a result, it is not necessary to reissue a class data replacement request after the request is once rejected. Therefore, when the class data is replaced, the load of the programmer can be reduced.

According to a further aspect of the present invention, a thread which is processing class data is stored. Only referencing the running thread list determines whether or not class data being processed exists, and the utilization of the class data can be easily checked.

According to a further aspect of the present invention, a class name corresponding to added class data is stored. The class management object can easily check the class data managed by itself, and can process class data for each piece of added class data.

According to a further aspect of the present invention, the reference of class data is stored in a class management object. A process can be performed on class data in consideration of the references of the class data, and the programmer does not have to recognize the reference relationship of the class data. Therefore, the program can be easily customized.

According to a further aspect of the present invention, an agent class object includes an access control class for checking access privileges from another agent class object. An agent class object can generate an access control object based on an access control class when another agent class object gains access. Therefore, each time an agent class object gains access, access privileges can be checked and an access condition can be easily amended for each agent class object, thereby improving the security of the interface in adding to or updating a program code.

According to a further aspect of the present invention, class names of class data are different from each other. A conflict in the same class in the shared class data table can be avoided.

According to a further aspect of the present invention, when a request to delete or replace the referenced class data is issued while the referencing class data is being processed, the deletion or replacement of the referenced class data can be temporarily held until the end of the process of the referencing class data, thereby avoiding unsuccessfully terminating the process on the class data.

According to a further aspect of the present invention, after completing the function of a part of a program specified in a deletion or replacement request, the function of the part of the program can be deleted or replaced. Therefore, suspending the program being executed or reactivating the program can be avoided when the function of the part of the program is deleted or replaced.

A further aspect of the present invention stores class data transmitted from another agent class object in a local class data table of a class management object. Thus, a remote evaluation can be smoothly performed by an agent class object such that a conflict can be avoided between the class data and class data stored already stored for the class management object.

According to a further aspect of the present invention, based on class data and serialized data of an object generated from the class data, the object generated from the class data is restored.

Thus, the object generated from the class data is serialized and transmitted, the serialized data is restored on a receiving side, and the object can be remotely evaluated.

According to a further aspect of the present invention, class data referenced by the class data to be processed is transmitted to perform a remote evaluation for class data having reference relationship.

According to a further aspect of the present invention, by transmitting class data not existing in an agent class object at a destination, the amount of communications in a remote evaluation can be reduced, and the remote execution speed can be enhanced.

What is claimed is:

1. An information processing apparatus operated by a computer program, comprising:
   a class data storage unit storing class data, which includes operation or method definitions, added to an object of the program which uses the class data;
   a class data monitor unit recognizing which class data stored in the class data storage unit is being used by the object when the program is operating; and
   a class data process unit replacing or deleting, in response to a request to replace or delete a class data, the class data specified in the request without stopping operation of the program after the object finishes using the specified class data, if it is recognized by the class data monitor unit that the specified class data is being used.

2. The apparatus according to claim 1, wherein said class data process unit comprises:
   a reception unit receiving the request to replace or delete the class data;
   a determination unit determining, based on recognition by the class data monitor unit, whether or not the class data specified in the request is being used by an object; and
   a delay unit delaying, when the determination unit determines that the specified class data is being used, replacement or deletion of the specified class data until the specified class data is released from a current use.

3. The apparatus according to claim 1, wherein said class data process unit comprises:
   a reception unit receiving the request to replace or delete the class data;
   a determination unit determining, based on recognition by the class data monitor unit, whether or not the class data specified in the request is being used by the object;
   a stop request issue unit issuing, when the determination unit determines that the specified class data is being used, a request to stop using the specified class data to an object which is using the specified class data; and
   an execution unit executing replacement or deletion of the specified class data after the object stops using the specified class data in response to the stop request.

4. The apparatus according to claim 2, wherein said reception unit comprises:
   a check unit checking whether or not the request is acceptable.

5. The apparatus according to claim 3, wherein said reception unit comprises:
   a check unit checking whether or not the request is acceptable.

6. The apparatus according to claims 1, wherein said class data process unit comprises:
   a class data addition unit adding class data, for a request to add class data, to said class data storage unit.

7. The apparatus according to claims 1, wherein said class data process unit comprises:
   a class data deletion unit deleting the class data after the class data to be deleted has been utilized.

8. The apparatus according to claims 1, wherein said class data process unit comprises:
   a class data replacement unit replacing the class data after the class data to be replaced has been utilized.

9. An information processing apparatus operated by a computer program, comprising:
   an agent class storage unit storing an agent class for generating an agent class object which monitors utilization of class data which includes operation or method definitions; and
   an agent class object generation unit generating the agent class object based on the agent class, wherein
      the agent class object generated by the agent class object generation unit recognizes which class data added to the agent class object is being used by an object of the program which uses the class data, and, in response to a request to replace or delete a class data, the class data specified in the request is replaced or deleted without stopping operation of the program after the object finishes using the specified class data, if it is recognized that the specified class data is being used.

10. The apparatus according to claim 9, wherein said agent class object comprises:
   a shared class data table for storing class data added to the agent class object;
   a class management object for managing the class data stored in the shared class data table to recognize which class data is being used by an object of the program when the program is operating; and
   a public remote method interface for replacing or deleting, in response to a request to replace or delete a class data, the class data specified in the request without stopping operation of the program after the object finishes using the specified class data, if it is recognized by the class management object that the specified class data is being used.

11. The apparatus according to claim 10, wherein said agent class further comprises:

a class management object table for storing a correspondence between said class management object generated for a request to add the class data and a name assigned when the request to add the class data is issued.

12. The apparatus according to claim 11, wherein said class management object comprises:
   a local class data table for storing class data specific to each class management object;
   a deletion flag for storing a request to delete the class data;
   a replacement class data storage area for storing new class data when a request to replace the class data is issued;
   a running thread ID list for storing identification information about a thread processing the class data;
   a class name list for storing a class name corresponding to the class data;
   a reference object list for storing identification information about a class management object which manages class data referenced by the class data; and
   a referenced object list for storing identification information about a class management object which manages class data by which the class data is referenced.

13. The apparatus according to claim 10, wherein said agent class stores:
   an access control class for checking access privileges of another agent class object in said shared class data table.

14. The apparatus according to claim 10, wherein said public remote method interface comprises:
   a class data addition unit adding class data to the agent class object.

15. The apparatus according to claim 14, wherein said class data addition unit comprises:
   a class management object generation unit generating a class management object for managing class data added to the agent class object;
   a class name registration unit registering a class name of the class data in a class name list in said class management object;
   a class data writing unit writing the class data in said shared class data table; and
   a class management object registration unit registering in said class management object table a name assigned when the request to add the class data is issued.

16. The apparatus according to claim 15, wherein said class data addition unit comprises:
   a shared class data table restoration unit restoring said shared class data table to an original state by deleting class data added to said agent class object from said shared class data table when a class name of class data added to said agent class object matches a class name of class data registered in said shared class data table.

17. The apparatus according to claim 10, wherein said public remote method interface comprises:
   a class data process unit processing class data stored in said agent class object.

18. The apparatus according to claim 17, wherein said class data process unit comprises:
   a first thread list setting unit setting identification information about a thread processing the class data in a running thread ID list of class management objects which manage class data being processed; and
   a second thread list setting unit setting identification information about a thread processing the class data in a running thread ID list of class management objects which manage class data referenced by class data being processed.

19. The apparatus according to claim 18, wherein said class data process unit comprises:
   a first running thread list check unit checking whether or not identification information about a thread is set in the running thread ID list of class management objects;
   a deletion flag determination unit determining a setting of a deletion flag of the class management object; and
   a deletion execution unit deleting class data corresponding to a class name of a class name list in a class management object from the shared class data table when the running thread ID list is empty and a deletion flag of the class management object is TRUE.

20. The apparatus according to claim 18, wherein said class data process unit comprises:
   a second running thread list check a checking whether or not identification information about a thread is set in the running thread ID list of class management objects;
   a replacement class data retrieval unit retrieving a replacement class data storage area of the class management object; and
   a replacement execution unit replacing class data which is to be replaced and is stored in the shared class data table with class data stored in the replacement class data storage area when the running thread ID list is empty and class data of a class management object is stored in the replacement class data storage area.

21. The apparatus according to claim 10, wherein said public remote method interface comprises:
   a class data deletion unit deleting class data from the agent class object.

22. The apparatus according to claim 21, wherein said class data deletion unit comprises:
   a third running thread list check unit checking a running thread ID list of class management objects which manage class data to be deleted; and
   a deletion flag setting unit stopping deleting the class data and setting TRUE a deletion flag of the class management object when identification information about a thread is set in the running thread ID list.

23. The apparatus according to claim 22, further comprising:
   an error notification unit issuing an error notification when a referenced object list of the class management objects is not empty; and
   an identification information deletion unit deleting identification information about the class management object from a referenced object list of class management objects which manage class data referenced by class data to be deleted when a reference object list of the class management objects is not empty.

24. The apparatus according to claim 10, wherein said public remote method interface comprises:
   a class data replacement unit replacing class data of the agent class object.

25. The apparatus according to claim 24, wherein said class data replacement unit comprises:
   a fourth running thread list check unit checking a running thread ID list of class management objects which manage class data to be replaced;
   a replacement data setting unit stopping replacing the class data and setting new class data in a replacement class data storage area of the class management object when identification information about a thread is set in the running thread ID list.

26. The apparatus according to claim 25, further comprising:

an error notification unit issuing an error notification when a referenced object list of the class management objects is not empty; and an identification information deletion unit deleting identification information about the class management object from a referenced object list of class management objects which manage class data referenced by class data to be replaced when a reference object list of the class management objects is not empty.

27. The apparatus according to claim 10, wherein said public remote method interface comprises:

a class data remote evaluation unit processing class data transmitted from another agent class object.

28. The apparatus according to claim 27, wherein said class data remote evaluation unit comprises:

a class data setting unit setting the class data in a local class data table of class management objects.

29. The apparatus according to claim 27, wherein said class data remote evaluation unit comprises:

a data receiving unit receiving class data and serialized data of object generated from the class data; and an object restoration unit restoring an object generated from the class data based on the class data and the serialized data.

30. The apparatus according to claim 27, wherein said class data remote evaluation unit comprises:

a class data invoking unit invoking class data referenced by class data to be processed from the shared class data table; and a first class data transmission unit transmitting the class data to be evaluated and class data referenced by the class data to be evaluated to another agent class object.

31. The apparatus according to claim 27, wherein said class data remote evaluation unit comprises:

a double class check unit checking whether or not class data to be evaluated exist in a shared class data table of a destination agent class object; and a second class data transmission unit transmitting, based on the check result, class data to be evaluated to the destination agent class object after removing class data existing in the destination agent class object.

32. The apparatus according to claim 9, wherein said agent class object comprises:

an access control object generation unit generating an access control object when access is gained from another agent class object; and an access control object execution unit checking access privileges.

33. A method of processing information by a computer program, comprising:

recognizing which function implemented by a class data, which includes operation or method definitions, of the program is being used by the program when the program is operating; and replacing or deleting, in response to a request to replace or delete a class data of the program, the class data specified in the request without stopping operation of the program after the program finishes using the specified class data, if it is recognized that the specified class data is being used.

34. A computer-readable storage medium used to direct a computer to perform a method of processing information by a computer program, the method comprising:

storing class data, which includes operation or method definitions, added to an object of the program which uses the class data;

recognizing which class data stored is being used by the object when the program is operating; and replacing or deleting, in response to a request or delete a class data, the class data specified in the request without stopping operation of the program after the object finishes using the specified class data, if it is recognized that the specified class data is being used.

35. A computer-readable storage medium used to direct a computer to perform a method of processing information by a computer program, the method comprising:

storing an agent class for generating an agent class object for monitoring utilization of class data which includes operation or method definitions; and generating the agent class object based on the agent class, wherein the generated agent class object recognizes which class data added to the agent class object is being used by the object, and, in response to a request to replace or delete a class data, the class data specified in the request is replaced or deleted without stopping operation of the program after the object finishes using the specified class data, if it is recognized that the specified class data is being used.

36. A process comprising:

operating a computer program which uses class data which includes operation or method definitions;

recognizing which class data is used by the computer program while the computer program is operating; and replacing or deleting, in response to a request to replace or delete a class data, the class data specified in the request without stopping operation of the program after use of the specified class data is finished, if it is recognized that the specified class data is being used.

37. An information processing apparatus operated by a a computer program, comprising:

class data storage means for storing class data, which includes operation or method definitions, added to an object of the computer program which uses the class data;

class data monitor means for recognizing which class data stored in the class data storage means is being used by the object when the program is operating; and class data process means for replacing or deleting, in response to a request to replace or delete a class data, the class data specified in the request without stopping operation of the program after the object finishes using the specified class data, if it is recognized by the class data monitor means that the specified class data is being used.

38. An information processing apparatus operated by a computer program, comprising:

agent class storage means for storing an agent class for generating an agent class object which monitors utilization of class data which includes operation or method definitions; and agent class object generation means for generating the agent class object based on the agent class, wherein the agent class object generated by the agent class object generation means recognizes which class data added to the agent class object is being used by an object of the program which uses the class data, and, in response to a request to replace or delete a class data, the class data specified in the request is replaced or deleted without stopping operation of the program after the object finishes using the specified class data, if it is recognized that the specified class data is being used.

* * * * *

UNITED STATES PATENT AND TRADEMARK OFFICE
CERTIFICATE OF CORRECTION

PATENT NO. : 6,308,182 B1  Page 1 of 1
DATED : October 23, 2001
INVENTOR(S) : Takashi Nishigaya et al.

It is certified that error appears in the above-identified patent and that said Letters Patent is hereby corrected as shown below:

<u>Column 32,</u>
Line 20, change "claims" to -- claim --.
Line 24, change "claims" to -- claim --.
Line 28, change "claims" to -- claim --.

Signed and Sealed this

Twenty-sixth Day of March, 2002

Attest:

*Attesting Officer*

JAMES E. ROGAN
*Director of the United States Patent and Trademark Office*